US010616108B2

(12) United States Patent
Josyula

(10) Patent No.: US 10,616,108 B2
(45) Date of Patent: Apr. 7, 2020

(54) SCALABLE MAC ADDRESS VIRTUALIZATION

(71) Applicant: AVAGO TECHNOLOGIES INTERNATIONAL SALES PTE. LIMITED, Singapore (SG)

(72) Inventor: Ramakanth Josyula, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 537 days.

(21) Appl. No.: 14/799,371

(22) Filed: Jul. 14, 2015

(65) Prior Publication Data

US 2016/0036703 A1 Feb. 4, 2016

Related U.S. Application Data

(60) Provisional application No. 62/030,532, filed on Jul. 29, 2014.

(51) Int. Cl.
*H04L 12/741* (2013.01)
*H04L 29/12* (2006.01)
*H04L 29/06* (2006.01)

(52) U.S. Cl.
CPC ........ *H04L 45/745* (2013.01); *H04L 61/6022* (2013.01); *H04L 69/22* (2013.01)

(58) Field of Classification Search
CPC ..... H04L 45/64; H04L 49/25; H04L 41/0826; H04L 4/12; H04L 45/00; H04L 45/745; H04W 84/18
See application file for complete search history.

(56) References Cited

U.S. PATENT DOCUMENTS

| 829,529 A | 8/1906 | Keathley |
| 5,390,173 A | 2/1995 | Spinney |

(Continued)

FOREIGN PATENT DOCUMENTS

| CN | 1735062 | 2/2006 |
| CN | 1777149 | 5/2006 |

(Continued)

OTHER PUBLICATIONS

Office Action dated Jan. 31, 2017, U.S. Appl. No. 13/184,526, filed Jul. 16, 2011.

(Continued)

*Primary Examiner* — Jael M Ulysse
(74) *Attorney, Agent, or Firm* — Xsensus, LLP

(57) ABSTRACT

One embodiment of the present invention provides a switch. The switch includes one or more ports, a media access control (MAC) address management apparatus, and a forwarding apparatus. The MAC address management apparatus generates a routable MAC address mapped to an end device's MAC address learned from one of the one or more ports. The routable MAC address includes an endpoint identifier identifying an endpoint for the end device. The forwarding apparatus swaps the learned MAC address with the routable MAC address in a header of a packet. Alternatively, the MAC address management apparatus provides one or more routable MAC addresses to a hypervisor for assigning to virtual machines running on the hypervisor. The forwarding apparatus then determines an egress port from the one or more ports for a packet comprising a routable MAC address based on the endpoint identifier.

16 Claims, 13 Drawing Sheets

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,559,990 B2 | 10/2009 | Mital |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,124,906 B2 | 8/2012 | Raman |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | Jha et al. |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |

(56) References Cited

U.S. PATENT DOCUMENTS

| | | |
|---|---|---|
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1* | 9/2002 | Tingley .............. H04L 29/12009 709/227 |
| 2002/0161867 A1* | 10/2002 | Cochran ........... H04L 29/12009 709/221 |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2003/0236916 A1* | 12/2003 | Adcox .............. H04L 29/12018 709/245 |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1* | 5/2006 | Kreeger .................. H04L 45/48 370/256 |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1* | 5/2007 | Parry .................. H04L 12/4633 370/437 |
| 2007/0110068 A1* | 5/2007 | Sekiguchi ......... H04L 29/12028 370/392 |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0297406 A1 | 12/2007 | Rooholamini |
| 2008/0031241 A1* | 2/2008 | Toebes .................... H04L 41/12 370/389 |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |

(56) References Cited

U.S. PATENT DOCUMENTS

| | | |
|---|---|---|
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0225875 A1* | 9/2008 | Wray .................. H04L 12/4633 370/419 |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1* | 11/2008 | Friskney ............. H04L 12/4645 370/395.53 |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | Halna DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1* | 8/2009 | Devireddy ............ G06F 13/387 370/419 |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur et al. |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1* | 7/2010 | Mehta .................. H04L 12/462 370/400 |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1* | 1/2011 | Mehta ................. H04L 12/4625 370/401 |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |

(56) References Cited

U.S. PATENT DOCUMENTS

| | | |
|---|---|---|
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0080836 A1* | 4/2011 | Bragg .................. H04L 12/413 |
| | | 370/241.1 |
| 2011/0085557 A1 | 4/2011 | Gnanasekaran |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1* | 11/2011 | Vobbilisetty .......... H04L 49/357 |
| | | 398/45 |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1* | 12/2011 | Vobbilisetty ........ H04L 12/4625 |
| | | 370/392 |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0177042 A1* | 7/2012 | Berman .............. H04L 12/4625 |
| | | 370/392 |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1* | 1/2013 | Raman .................. H04L 45/745 |
| | | 370/401 |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0194914 A1 | 8/2013 | Agarwal |
| 2013/0201992 A1 | 8/2013 | Masaki |
| 2013/0215754 A1* | 8/2013 | Tripathi ................ H04L 49/253 |
| | | 370/236 |
| 2013/0219473 A1 | 8/2013 | Schaefer |

(56) References Cited

U.S. PATENT DOCUMENTS

| | | | |
|---|---|---|---|
| 2013/0223221 A1 | 8/2013 | Xu | |
| 2013/0223438 A1* | 8/2013 | Tripathi | H04L 45/66 370/355 |
| 2013/0223449 A1 | 8/2013 | Koganti | |
| 2013/0238802 A1* | 9/2013 | Sarikaya | H04L 29/08153 709/226 |
| 2013/0250947 A1* | 9/2013 | Zheng | H04L 45/02 370/389 |
| 2013/0250951 A1 | 9/2013 | Koganti | |
| 2013/0250958 A1 | 9/2013 | Watanabe | |
| 2013/0259037 A1 | 10/2013 | Natarajan | |
| 2013/0266015 A1 | 10/2013 | Qu | |
| 2013/0268590 A1 | 10/2013 | Mahadevan | |
| 2013/0272135 A1 | 10/2013 | Leong | |
| 2013/0294451 A1 | 11/2013 | Li | |
| 2013/0297757 A1 | 11/2013 | Han | |
| 2013/0301425 A1 | 11/2013 | Udutha et al. | |
| 2013/0301642 A1 | 11/2013 | Radhakrishnan | |
| 2013/0308492 A1 | 11/2013 | Baphna | |
| 2013/0308641 A1* | 11/2013 | Ackley | H04L 45/7457 370/392 |
| 2013/0308647 A1 | 11/2013 | Rosset | |
| 2013/0315125 A1 | 11/2013 | Ravishankar | |
| 2013/0315246 A1* | 11/2013 | Zhang | H04L 12/56 370/392 |
| 2013/0315586 A1 | 11/2013 | Kipp | |
| 2013/0322427 A1 | 12/2013 | Stiekes | |
| 2013/0329605 A1 | 12/2013 | Nakil | |
| 2013/0332660 A1 | 12/2013 | Talagala | |
| 2013/0336104 A1 | 12/2013 | Talla | |
| 2013/0346583 A1 | 12/2013 | Low | |
| 2014/0010239 A1* | 1/2014 | Xu | H04L 12/4641 370/395.53 |
| 2014/0013324 A1 | 1/2014 | Zhang | |
| 2014/0019608 A1 | 1/2014 | Kawakami | |
| 2014/0019639 A1* | 1/2014 | Ueno | H04L 61/103 709/238 |
| 2014/0025736 A1 | 1/2014 | Wang | |
| 2014/0029412 A1* | 1/2014 | Janardhanan | H04L 45/66 370/221 |
| 2014/0029419 A1 | 1/2014 | Jain | |
| 2014/0044126 A1 | 2/2014 | Sabhanatarajan | |
| 2014/0050223 A1 | 2/2014 | Foo | |
| 2014/0056298 A1 | 2/2014 | Vobbilisetty | |
| 2014/0059225 A1 | 2/2014 | Gasparakis | |
| 2014/0064056 A1 | 3/2014 | Sakata | |
| 2014/0071987 A1 | 3/2014 | Janardhanan | |
| 2014/0086253 A1* | 3/2014 | Yong | H04L 12/4633 370/395.53 |
| 2014/0092738 A1 | 4/2014 | Grandhi | |
| 2014/0105034 A1 | 4/2014 | Huawei | |
| 2014/0112122 A1 | 4/2014 | Kapadia | |
| 2014/0115584 A1* | 4/2014 | Mudigonda | H04L 67/1095 718/1 |
| 2014/0140243 A1 | 5/2014 | Ashwood-Smith | |
| 2014/0157251 A1 | 6/2014 | Hocker | |
| 2014/0169368 A1 | 6/2014 | Grover | |
| 2014/0188996 A1* | 7/2014 | Lie | G06F 11/0709 709/204 |
| 2014/0192804 A1 | 7/2014 | Ghanwani | |
| 2014/0195695 A1 | 7/2014 | Okita | |
| 2014/0241147 A1 | 8/2014 | Rajagopalan | |
| 2014/0258446 A1 | 9/2014 | Bursell | |
| 2014/0269701 A1 | 9/2014 | Kaushik | |
| 2014/0269709 A1* | 9/2014 | Benny | H04L 45/64 370/392 |
| 2014/0269720 A1 | 9/2014 | Srinivasan | |
| 2014/0269733 A1 | 9/2014 | Venkatesh | |
| 2014/0298091 A1 | 10/2014 | Carlen | |
| 2014/0334489 A1* | 11/2014 | Bosshart | H04L 47/56 370/392 |
| 2014/0355477 A1 | 12/2014 | Velayudhan et al. | |
| 2014/0362854 A1 | 12/2014 | Addanki | |
| 2014/0362859 A1 | 12/2014 | Addanki | |
| 2014/0376550 A1* | 12/2014 | Khan | H04L 45/74 370/392 |
| 2015/0009992 A1 | 1/2015 | Zhang | |
| 2015/0010007 A1 | 1/2015 | Matsuhira | |
| 2015/0016300 A1 | 1/2015 | Devireddy | |
| 2015/0030031 A1 | 1/2015 | Zhou | |
| 2015/0092593 A1 | 4/2015 | Kompella | |
| 2015/0103826 A1* | 4/2015 | Davis | H04L 49/25 370/392 |
| 2015/0110111 A1 | 4/2015 | Song | |
| 2015/0110487 A1 | 4/2015 | Fenkes | |
| 2015/0117256 A1 | 4/2015 | Sabaa | |
| 2015/0117454 A1* | 4/2015 | Koponen | H04L 61/2532 370/392 |
| 2015/0127618 A1 | 5/2015 | Alberti | |
| 2015/0139234 A1 | 5/2015 | Hu | |
| 2015/0143369 A1 | 5/2015 | Zheng | |
| 2015/0172098 A1 | 6/2015 | Agarwal | |
| 2015/0188753 A1 | 7/2015 | Anumala | |
| 2015/0188770 A1* | 7/2015 | Naiksatam | H04L 41/0893 370/254 |
| 2015/0195093 A1 | 7/2015 | Ramasubramani | |
| 2015/0222506 A1 | 8/2015 | Kizhakkiniyil | |
| 2015/0248298 A1 | 9/2015 | Gavrilov | |
| 2015/0263897 A1* | 9/2015 | Ganichev | H04L 41/0806 370/254 |
| 2015/0263899 A1* | 9/2015 | Tubaltsev | H04L 45/02 370/254 |
| 2015/0263991 A1 | 9/2015 | MacChiano | |
| 2015/0281066 A1 | 10/2015 | Koley | |
| 2015/0301901 A1 | 10/2015 | Rath | |
| 2015/0347468 A1 | 12/2015 | Bester | |
| 2016/0072899 A1 | 3/2016 | Tung | |
| 2016/0087885 A1 | 3/2016 | Tripathi | |
| 2016/0139939 A1 | 5/2016 | Bosch | |
| 2016/0182458 A1 | 6/2016 | Shatzkamer | |
| 2016/0212040 A1 | 7/2016 | Bhagavathiperumal | |
| 2016/0344640 A1 | 11/2016 | Soderlund et al. | |
| 2017/0012880 A1 | 1/2017 | Yang | |
| 2017/0026197 A1 | 1/2017 | Venkatesh | |
| 2017/0097841 A1 | 4/2017 | Chang | |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |

(56) References Cited

FOREIGN PATENT DOCUMENTS

| | | |
|---|---|---|
| WO | 2012033663 | 3/2012 |
| WO | 2012093429 | 7/2012 |
| WO | 2014031781 | 2/2014 |

OTHER PUBLICATIONS

Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated 06/18/215, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.2 Dec. 5, 2011.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
'An Introduction to Brocade VCS Fabric Technology', Brocade white paper, http://community.brocade.com/docs/DOC-2954, Dec. 3, 2012.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'Brocade Unveils' The Effortless Network, http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

(56) References Cited

OTHER PUBLICATIONS

Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Router Redundancy Protocol (VRRP) Version 3 for IPv4 and IPv6', Internet Engineering Task Force, Mar. 2010.
TRILL Working Group Internet-Draft Intended status: Proposed Standard RBridges: Base Protocol Specificaiton Mar. 3, 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.

(56) References Cited

OTHER PUBLICATIONS

Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 29, 2013.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30,

(56) References Cited

OTHER PUBLICATIONS

2009), pp. 1-6, XP002649647, DOI: 10.1109/GLOBECOM.2009. 5360776 ISBN: 1-4244-5626-0 [retrieved on Jul. 19, 2011].

Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.

Office action dated Oct. 2, 2014, for U.S. Appl. No. 13/092,752, filed Apr. 22, 2011.

Kompella, Ed K. et al., 'Virtual Private LAN Service (VPLS) Using BGP for Auto-Discovery and Signaling' Jan. 2007.

Office Action for U.S. Appl. No. 13/042,259, filed Mar. 7, 2011, dated Feb. 23, 2015.

Office Action for U.S. Appl. No. 13/044,301, filed Mar. 9, 2011, dated Jan. 29, 2015.

Office Action for U.S. Appl. No. 13/050,102, filed Mar. 17, 2011, dated Jan. 26, 2015.

Office Action for U.S. Appl. No. 13/092,460, filed Apr. 22, 2011, dated Mar. 13, 2015.

Office Action for U.S. Appl. No. 13/092,752, filed Apr. 22, 2011, dated Feb. 27, 2015.

Office Action for U.S. Appl. No. 13/425,238, filed Mar. 20, 2012, dated Mar. 12, 2015.

Office Action for U.S. Appl. No. 13/425,238, dated Mar. 12, 2015.

Office Action for U.S. Appl. No. 13/786,328, filed Mar. 5, 2013, dated Mar. 13, 2015.

Office Action for U.S. Appl. No. 14/577,785, filed Dec. 19, 2014, dated Apr. 13, 2015.

Rosen, E. et al., "BGP/MPLS VPNs", Mar. 1999.

Mahalingam "VXLAN: A Framework for Overlaying Virtualized Layer 2 Networks over Layer 3 Networks" Oct. 17, 2013 pp. 1-22, Sections 1, 4 and 4.1.

Office action dated Apr. 30, 2015, U.S. Appl. No. 13/351,513, filed Jan. 17, 2012.

Office Action dated Apr. 1, 2015, U.S. Appl. No. 13/656,438, filed Oct. 19, 2012.

Office Action dated May 21, 2015, U.S. Appl. No. 13/288,822, filed Nov. 3, 2011.

Siamak Azodolmolky et al. "Cloud computing networking: Challenges and opportunities for innovations", IEEE Communications Magazine, vol. 51, No. 7, Jul. 1, 2013.

Office action dated Jun. 8, 2015, U.S. Appl. No. 14/178,042, filed Feb. 11, 2014.

Office Action dated Jun. 10, 2015, U.S. Appl. No. 13/890,150, filed May 8, 2013.

Office Action for U.S. Appl. No. 14/817,097, dated May 4, 2017.

Office Action for U.S. Appl. No. 14/872,966, dated Apr. 20, 2017.

Office Action for U.S. Appl. No. 14/680,915, dated May 3, 2017.

Office Action for U.S. Appl. No. 14/792,166, dated Apr. 26, 2017.

Office Action for U.S. Appl. No. 14/662,095, dated Mar. 24, 2017.

Office Action for U.S. Appl. No. 15/005,967, dated Mar. 31, 2017.

Office Action for U.S. Appl. No. 15/215,377, dated Apr. 7, 2017.

Office Action for U.S. Appl. No. 13/098,490, dated Apr. 6, 2017.

Office Action for U.S. Appl. No. 14/662,092, dated Mar. 29, 2017.

Office Action for U.S. Appl. No. 14/660,803, dated May 17, 2017.

Office Action for U.S. Appl. No. 14/488,173, dated May 12, 2017.

Office Action for U.S. Appl. No. 13/288,822, dated May 26, 2017.

Office Action for U.S. Appl. No. 14/329,447, dated Jun. 8, 2017.

Office Action for U.S. Appl. No. 14/216,292, dated Oct. 6, 2017.

Office Action dated Oct. 25, 2017, U.S. Appl. No. 14/867,865, filed Sep. 28, 2015.

Office action dated Oct. 26, 2017, U.S. Appl. No. 14/817,097, filed Aug. 3, 2015.

Office Action dated Mar. 20, 2018, U.S. Appl. No. 14/867,865, filed Sep. 28, 2015.

\* cited by examiner

SCALABLE MAC ADDRESS VIRTUALIZATION

RELATED APPLICATIONS

This application claims the benefit of U.S. Provisional Application No. 62/030,532, titled "Data Center Virtualization over Fabric Tunnels," by inventor Ramakanth Josyula, filed 29 Jul. 2014, the disclosure of which is incorporated by reference herein.

The present disclosure is related to U.S. Pat. No. 8,867,552, titled "Virtual Cluster Switching," by inventors Suresh Vobbilisetty and Dilip Chatwani, issued 21 Oct. 2014, and to U.S. patent application Ser. No. 13/092,752, titled "Name Services for Virtual Cluster Switching," by inventors Suresh Vobbilisetty, Phanidhar Koganti, and Jesse B. Willeke, filed 22 Apr. 2011, the disclosures of which are incorporated by reference herein.

BACKGROUND

Field

This disclosure relates to communication networks. More specifically, this disclosure relates to a system and method for scalable media access control (MAC) address virtualization.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate diverse network demands efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 and layer-3 (e.g., Ethernet and Internet Protocol (IP), respectively) switching technologies continue to evolve. IP facilitates routing and end-to-end data transfer in wide area networks (WANs) while providing safeguards for error-free communication. On the other hand, more routing-like functionalities are migrating into layer-2. Notably, the development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic becomes more diverse, network virtualization is becoming progressively more important as a value proposition for network architects. In addition, the evolution of virtual computing has made multi-tenancy attractive and, consequently, placed additional requirements on the network. For example, a switch may couple a large number of virtual servers and learn the virtual MAC addresses of the virtual servers. It is often desirable that the network infrastructure can provide a scalable MAC address management for a large number of end devices.

While today's networks support many desirable features, some issues remain unsolved in efficiently facilitating scalable MAC address virtualization.

SUMMARY

One embodiment of the present invention provides a switch. The switch includes one or more ports, a media access control (MAC) address management apparatus, and a forwarding apparatus. The MAC address management apparatus generates a virtualized routable MAC address in response to learning a MAC address of an end device from one of the one or more ports, and stores a mapping between the learned MAC address and the routable MAC address in a MAC address mapping table in a local storage device. The routable MAC address includes an endpoint identifier identifying an endpoint for the end device. The forwarding apparatus, in response to identifying the learned MAC address in a header of a packet, swaps the learned MAC address with the routable MAC address.

In a variation on this embodiment, the endpoint is one or more of: a switch, an interface, a port, a link aggregation group, a server hosting a virtual machine, a hypervisor, and a tunnel endpoint.

In a variation on this embodiment, the routable MAC address further includes a token representing the end device. The token uniquely identifies the end device from a second end device coupled to the endpoint.

In a variation on this embodiment, the MAC address management apparatus identifies a system identifier of the endpoint mapped to the endpoint identifier from an endpoint mapping table in the local storage device. The forwarding apparatus identifies a forwarding entry for the system identifier in a local forwarding table. The forwarding entry maps the system identifier to a port of the one or more ports.

In a variation on this embodiment, the forwarding apparatus identifies a forwarding entry for the endpoint identifier in a local forwarding table. The forwarding entry maps the endpoint identifier to a port of the one or more ports. The forwarding apparatus then selects the port as the egress port for a packet with the routable MAC address as the destination address.

In a variation on this embodiment, the switch includes a distribution apparatus, which generates a Reverse Address Resolution Protocol (RARP) request for the learned MAC address. The distribution apparatus modifies an RARP reply by swapping the learned MAC address with the routable MAC address in the RARP reply and determines one or more egress ports for the modified RARP reply.

In a variation on this embodiment, the MAC address management apparatus learns a virtual MAC address of a migrated virtual machine from one of the one or more ports, and constructs a notification message destined for a second switch. The notification message indicates migration of the migrated virtual machine.

In a variation on this embodiment, the switch includes a tunnel management apparatus, which encapsulates a packet in a tunnel encapsulation header associated with a tunnel. The MAC address management apparatus identifies a system identifier of the tunnel mapped to the endpoint identifier from an endpoint mapping table in the local storage device. The forwarding apparatus identifies an egress port associated with the system identifier of the tunnel for the encapsulated packet.

In a variation on this embodiment, the switch and a second switch operate as high-availability gateways, wherein the endpoint identifier is associated with the switch and the second switch.

One embodiment of the present invention provides a switch. The switch includes one or more ports, a MAC address management apparatus, and a forwarding apparatus. The MAC address management apparatus creates a notification message destined for a hypervisor. The notification message comprises in payload one or more routable MAC addresses for assigning to virtual machines running on the hypervisor. The routable MAC addresses include an endpoint identifier identifying an endpoint for the virtual machines. The forwarding apparatus, in response to identifying one of the routable MAC addresses in a header of a packet, determines an egress port from the one or more ports for the packet based on the endpoint identifier.

BRIEF DESCRIPTION OF THE FIGURES

In the figures, like reference numerals refer to the same figure elements.

DETAILED DESCRIPTION

Figure 1A:
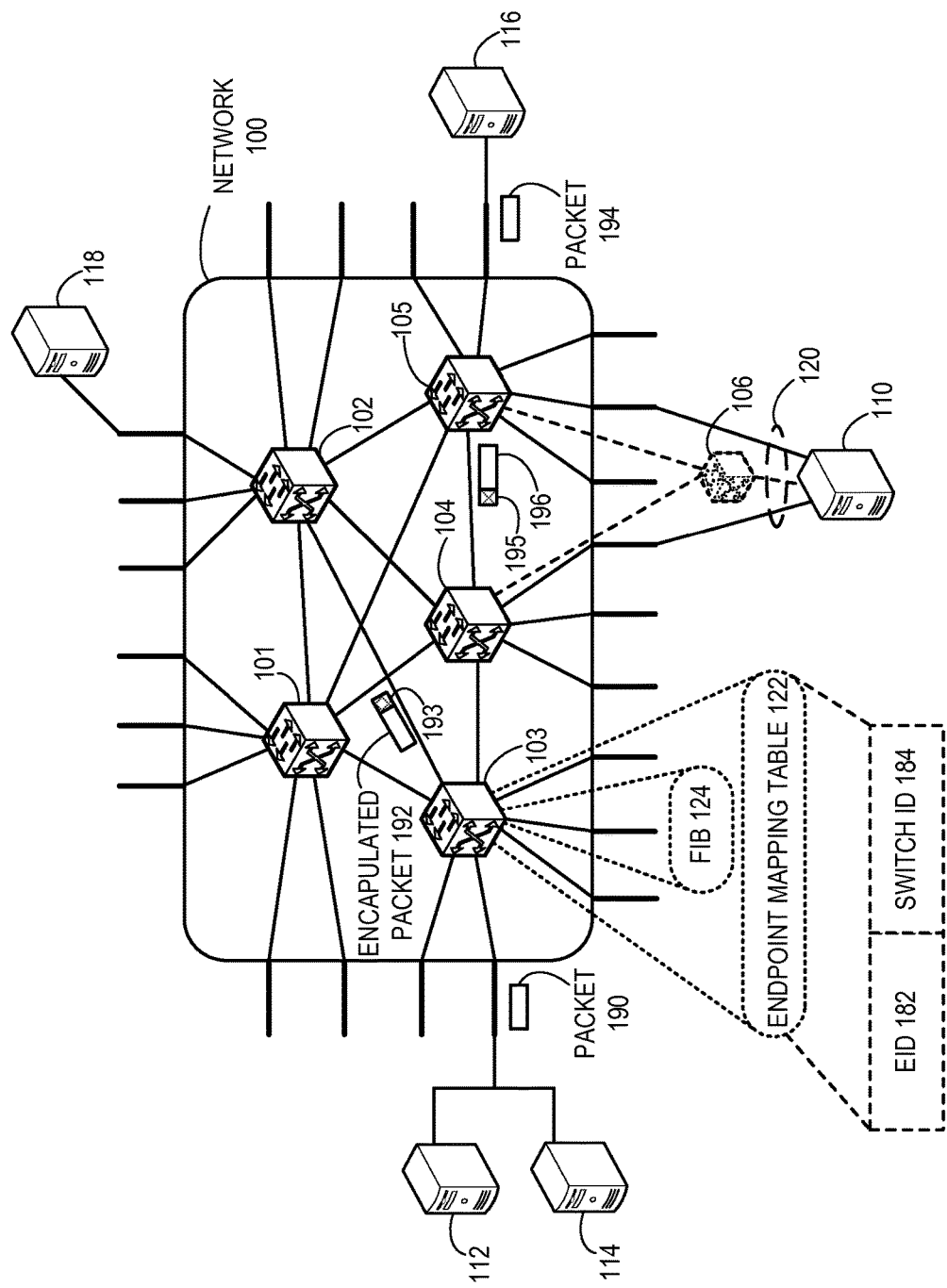
FIG. 1A illustrates an exemplary network with scalable media access control (MAC) address virtualization support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating scalable MAC address virtualization is solved by mapping a MAC address of an end device with a routable MAC address. The routable MAC address is a virtualized MAC address and allows a switch to identify the endpoint coupling the end device and forward a packet with the routable MAC address accordingly.

With existing technologies, a respective physical server can host a plurality of virtual machines, each of which may have multiple MAC addresses. As a result, a switch coupling a large number of such servers may need to learn a large number of MAC addresses. Furthermore, in a network, such as a fabric switch, where a learned MAC address is shared among the member switches of the network, the burden of learning a respective switch learning a respective MAC address can be significant. This can become a bottleneck for scaling up such a network.

To solve this problem, embodiments of the present invention allow a switch in a network to use a routable MAC address for communication within the network. A routable MAC address for an end device encodes an identifier of an endpoint (which can be referred to as an endpoint identifier) coupling the end device. Examples of an endpoint include, but are not limited to, a switch, an interface (or port), a link aggregation group, a server (e.g., a host machine hosting a virtual machine), a hypervisor, and a tunnel endpoint. Upon receiving a packet from an end device, the switch allocates a routable MAC address corresponding to the MAC address of the end device (i.e., the source MAC address of the packet). The switch creates a mapping between the end device's MAC address and the routable MAC address, and stores the mapping in a local storage device. For subsequent communications, the switch swaps the end device's MAC address from a respective packet from the end device with the corresponding routable MAC address.

A respective switch of the network maintains a mapping between an endpoint identifier and a corresponding switch identifier. Since the routable MAC address includes the endpoint identifier, a switch in the network can identify a corresponding switch identifier from the routable MAC address based on the endpoint identifier. The switch then can retrieve forwarding information for a routable MAC address from the local forwarding table based on the switch identifier. In this way, a switch can forward a packet to the switch coupling the end device associated with the routable MAC address without explicitly learning the end device's original MAC address and its association with the switch it couples. As a result, only the switch coupling an end device learns the MAC address of the end device. Other switches simply forward packets based on the routable MAC address.

In some embodiments, the network is a fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared with a respective member switch of the fabric switch.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., which does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device" and "host machine" are used interchangeably.

The term "hypervisor" is used in a generic sense, and can refer to any virtual machine manager. Any software, firmware, or hardware that creates and runs virtual machines can be a "hypervisor." The term "virtual machine" is also used in a generic sense and can refer to software implementation of a machine or device. Any virtual device which can execute a software program similar to a physical device can be a "virtual machine." A host external device on which a hypervisor runs one or more virtual machines can be referred to as a "host machine."

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary network with scalable media access control (MAC) address virtualization support, in accordance with an embodiment of the present invention. As illustrated in FIG. 1A, a network 100 includes member switches 101, 102, 103, 104, and 105. Network 100 can be a TRILL network and a respective member switch, such as switch 103, can be a TRILL RBridge. Network 100 can also be an IP network and a respective member switch, such as switch 103, can be an IP-capable switch, which calculates and maintains a local IP routing table (e.g., a routing information base or RIB), and is capable of forwarding packets based on its IP addresses. In some embodiments, network 100 is a fabric switch, and one or more switches in fabric switch 100 can be virtual switches (e.g., a software switch running on a computing device).

Switch 103 is coupled to end devices 112 and 114, switch 105 is coupled to end device 116, and switch 102 is coupled to end device 118. Member switches in network 100 use edge ports to communicate with end devices and inter-switch ports to communicate with other member switches. For example, switch 103 is coupled to end devices 112 and 114 via edge ports and to switches 101, 102, and 104 via inter-switch ports. End devices 112 and 114 can reside within the same local area network. As a result, a packet from end device 112 to end device 114 can be forwarded without switch 103 forwarding it.

With existing technologies, end devices 112 and 114 can be physical servers hosting a plurality of virtual machines, each of which may have multiple MAC addresses. As a result, switch 103 may need to learn a large number of MAC addresses from end devices 112 and 114. Furthermore, if network 100 is a fabric switch, when switch 103 learns a MAC address, switch 103 shares the learned MAC address with the other member switches. As a result, a respective switch in network 100 needs to learn a large number of MAC addresses. Since the capacity of a content addressable memory (CAM) in a switch is limited, learning a large number of MAC address can limit the scale of network 100.

To solve this problem, switch 103 uses a routable MAC address for communication within network 100. A routable MAC address encodes an identifier of an endpoint. Examples of an endpoint include, but are not limited to, a switch, an interface (or port), a link aggregation group, a server (e.g., a host machine hosting a virtual machine), a hypervisor, and a tunnel endpoint. The endpoint identifier can be mapped to a corresponding system identifier. A system identifier for an endpoint can be distinct from an endpoint identifier. A system identifier can be an identifier which is standard and uniform for that type of endpoint. On the other hand, an endpoint identifier can be an integer value specific for that network. For example, in a network with five switches, endpoint identifiers can be integers 1-5, and the system identifiers can be the standard IP addresses for the switches.

If the endpoint is a switch, the system identifier can be a switch identifier (e.g., an IP address or an RBridge identifier of the switch). If a respective edge port in network 100 can be uniquely identified by a port identifier, the system identifier can also be a unique port identifier. The port identifier can include one or more of: a switch identifier, a chassis number, and a port number. An endpoint identifier can be configured statically by a user for a network. The endpoint identifier can also be derived from the system identifier of the endpoint. If the endpoint is a switch, the endpoint identifier can be derived from the switch identifier (e.g., based on partial bit selection, hash function, etc.). This allows dynamic allocation of an endpoint identifier.

In some embodiments, switch 103 maintains the mapping in an endpoint mapping table 122. For example, if switch identifier 184 and endpoint identifier 182 are associated with switch 103, endpoint identifier 182 can be mapped to switch identifier 184 in endpoint mapping table 122. Endpoint mapping table 122 can be replicated in a respective switch in network 100. This allows switch 103 to identify an egress switch for a packet based on the endpoint identifier in the routable MAC address of the packet. For example, if the endpoint identifier is mapped to the switch identifier of switch 105, switch 103 can obtain the switch identifier from table 122 based on the endpoint identifier in the routable MAC address.

In some embodiments, switch 103 has a forwarding entry in its forwarding table 124 (which can also be referred to as forwarding information base 124) based on an endpoint identifier. The forwarding entry can include an egress port corresponding to the endpoint identifier. As a result, when switch 103 identifies that endpoint identifier in a routable MAC address as the destination address of a packet, switch 103 forwards the packet via the egress port in the forwarding entry. In some embodiments, the forwarding entry for an endpoint identifier can be based on the forwarding entry for the corresponding switch identifier. For example, the forwarding entry for endpoint identifier 182 in forwarding table 124 can be based on the forwarding entry for switch identifier 184. If switch 103 maintains the forwarding entry in forwarding table 124 based on the endpoint identifier, switch 103 may not maintain endpoint mapping table 122.

During operation, switch 103 receives a packet 190 (e.g., an Ethernet frame comprising an IP packet) from end device 112. Switch 103 identifies the source MAC address of packet 190 from its Ethernet header. Because packet 190 is from end device 112, the source MAC address of packet 190 belongs to end device 112. Switch 103 allocates a routable MAC address corresponding to the MAC address of end device 112. Switch 103 then creates a mapping between end device 112's MAC address and the routable MAC address, and stores the mapping in a local routable MAC mapping table in a local storage device.

Upon allocating the routable MAC address for end device 112, switch 103 uses a Reverse Address Resolution Protocol (RARP) query to end device 112 for end device 112's MAC address. Switch 103 receives a reply, replaces end device 112's MAC address in the reply with the routable MAC address, and forwards the reply to a respective other switch in network 100. Switch 103 can snoop for ARP and RARP messages before forwarding. In this way, other switches, such as switch 105, and end devices, such as end device 116, in network 100 learn of the routable MAC address of end device 112.

Before forwarding in network 100, switch 103 replaces end device 112's MAC address, which is the source address in the Ethernet header of packet 190, with end device 112's routable MAC address. In this way, a respective packet from end device 112 has end device 112's routable MAC address instead of its original MAC address. Other switches (e.g., switches 101, 102, 104, and 105) and end devices (e.g., end device 116) only observe end device 112's routable MAC address in network 100. As a result, packets destined for end device 112 from other switches carry end device 112's routable MAC address as the destination address. Since end device 112's routable MAC address includes the endpoint identifier for switch 103, based on the corresponding entry in a local endpoint identifier table, other switches can determine switch 103 to be the egress switch for the packets destined for end device 112.

In the same way, only switch 105 learns end device 116's original MAC address, and other switches observe end device 116's routable MAC address, which encodes switch 105's endpoint identifier. It should be noted that since end devices 112 and 114 are in the same LAN segment, a packet from end device 112 can reach end device 114 without switch 103 forwarding it. As a result, end device 114 receives packets with end device 112's MAC address. When any other end device, such as end device 116, receives end device 112's packet forwarded by switch 103, that packet carries end device 112's routable MAC address.

Suppose that packet 190 is destined for end device 116. Since switch 103 and end device 112 are only aware of end device 116's routable MAC address, end device 112 uses end device 116's routable MAC address as the destination address in the Ethernet header of packet 190. Based on the corresponding entry in endpoint mapping table 122, switch 103 determines switch 105 to be the egress switch for the packets destined for end device 116. Switch 103 encapsulates packet 190 in an encapsulation header 193 and generates encapsulated packet 192. Encapsulation header 193 includes switch 105's switch identifier as the egress switch identifier. Switch 103 then forwards encapsulated packet 192 based on the forwarding entry in forwarding table 124.

Encapsulation header 193 can be a fabric encapsulation header (e.g., an encapsulation header used to forward the packet in a fabric switch) or a tunnel header (e.g., an encapsulation header used to forward the packet via a tunnel). Examples of a fabric encapsulation header include, but are not limited to, a TRILL header, an IP header, an Ethernet header, and a combination thereof. Examples of a tunnel include, but are not limited to, Virtual Extensible Local Area Network (VXLAN), Generic Routing Encapsulation (GRE), and its variations, such as Network Virtualization using GRE (NVGRE) and openvSwitch GRE. The VLAN identifier of a global VLAN can be included in the encapsulation header.

Switch 104 receives packet 192 and forwards it based on encapsulation header 193 to switch 105. Upon receiving packet 192, switch 105 determines the packet to be destined to the local switch, decapsulates encapsulation header 193, and forwards packet 190 to end device 116. End device 116 then generates a response packet 194 (e.g., an Ethernet frame comprising an IP packet) and sends packet 194 to end device 112. Since switch 105 and end device 116 are only aware of end device 112's routable MAC address, end device 116 uses end device 112's routable MAC address as the destination address in the Ethernet header of packet 194.

Upon receiving packet 194, based on the corresponding entry in the local endpoint identifier table, switch 105 determines switch 103 to be the egress switch for the packets destined for end device 112. Before forwarding in network 100, switch 105 replaces end device 116's MAC address, which is the source address in the Ethernet header of packet 194, with end device 116's routable MAC address. Switch 103 encapsulates packet 194 in an encapsulation header 195 and generates encapsulated packet 196. Encapsulation header 195 includes switch 103's switch identifier as the egress switch identifier. Switch 105 then forwards encapsulated packet 196 based on the forwarding entry in the local forwarding table.

Packet 196 is then received by switch 103. Switch 103 can identify the egress switch address in header 195 to be a local address and decapsulate the packet to extract inner packet 194. Switch 103 then swaps the routable MAC address of end device 112 with end device 112's original MAC address in the Ethernet header of the inner packet and forwards the inner packet to end device 112. In this way, switches in network 100 can forward traffic based on the routable MAC addresses without learning about the MAC addresses coupled to the remote switches.

Switches 104 and 105 couple an end device 110 via a virtual link aggregation group (VLAG) 120. Switches 104 and 105 are configured to operate in a special "trunked" mode for end device 110. End device 110 views switches 104 and 105 as a common virtual switch 106, with a corresponding virtual address. End device 110 is considered to be logically coupled to virtual switch 106 via logical links (represented by dashed lines). Virtual switch 106 is considered to be logically coupled to both switches 104 and 105, optionally with zero-cost links (also represented by dashed lines). While forwarding data frames from end device 110, switches 104 and 105 mark the data frames with virtual switch 106's address as their source address. As a result, other switches in network 100 can learn that end device 110 is reachable via virtual switch 106. Hence, multi-pathing can be achieved when other switches choose to send data frames to virtual switch 106 (which is marked as the egress switch in the frames) via switches 104 and 105.

In the following description, switches which participate in virtual link aggregation group 120 are referred to as "partner switches." Since the two partner switches function as a single logical switch, the MAC address reachability learned by a respective switch is shared with the other partner switch. For example, during normal operation, end device 110 may choose to send its outgoing data frames only via the link to switch 105. As a result, only switch 105 would learn end device 110's MAC address. This information is then shared by switch 105 with switch 104 via an inter-switch link.

In some embodiments, an endpoint identifier in the routable MAC address of end device 110 can associated with the virtual switch identifier of virtual switch 106. As a result, other switches can forward a packet to end device 110 based on the endpoint identifier toward virtual switch 106. That packet can be received by either switch 104 or 105. Switch 104 or 105 can identify the virtual switch address to be a local address and decapsulate the packet to extract the inner packet. Switch 104 or 105 then swaps the routable MAC address of end device 110 with end device 110's original MAC address in the Ethernet header of the inner packet and forwards the inner packet to end device 110.

In some embodiments, a respective member switch of network 100 (e.g., switch 103) runs a control plane with automatic configuration capabilities (e.g., based on IP or Fibre Channel (FC)) and forms a logical Ethernet switch based on the automatic configuration capabilities of the control plane. To an external end device, such as end device 112, network 100 can appear as a single Ethernet switch. Upon joining network 100 via the control plane, a respective member switch receives an automatically assigned identifier corresponding to the logical Ethernet switch. However, unlike an FC fabric, the data packets in network 100 can be encapsulated and forwarded based on another forwarding protocol. Examples of this forwarding protocol include, but are not limited to, Ethernet, TRILL, and IP. Furthermore, a respective member switch of network 100 can be associated with a group identifier, which identifies network 100 as a group of interconnected switches. If network 100 is a fabric switch, this group identifier can be a fabric identifier identifying the fabric switch.

In some embodiments, network 100 maintains a port profile for a respective virtual machine. A port profile represents Fibre Channel over Ethernet (FCoE) configuration, VLAN configuration, data center bridging (DCB) configuration, quality of service (QoS) configuration, and/or security configuration of one or more virtual machines. The MAC address of a virtual machine associates the corresponding port profile to the virtual machine. This MAC address can be an original virtual MAC address (e.g., originally assigned by a hypervisor), a routable MAC address assigned as a virtual MAC address, or a routable MAC address mapped to the original virtual MAC address.

Port profile management in a switch is specified in U.S. Patent Publication No. 2011/0299413, titled "Port profile management for virtual cluster switching," the disclosure of which is incorporated herein in its entirety.

Routable MAC Address

Figure 1B:
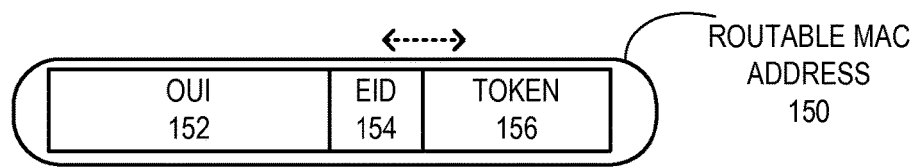
FIG. 1B illustrates an exemplary routable MAC address for scalable MAC address virtualization support, in accordance with an embodiment of the present invention.

FIG. 1B illustrates an exemplary routable MAC address for scalable MAC address virtualization support, in accordance with an embodiment of the present invention. A routable MAC address can have the same length of an original MAC address. Typically, a MAC address includes an organizationally unique identifier (OUI), which is usually 24 bits long and can identify a manufacturer or vendor of the device to which the MAC address belongs. In this example, routable MAC address 150 includes an OUI 152. This can be the OUI of the vendor of the switch that generates routable MAC address 150. The remaining 24 bits of routable MAC address 150 represent an endpoint identifier 154 and a token 156. For example, if endpoint identifier 154 is 8 bits (i.e., one byte) long, token 156 is 16 bits long. Token 156 distinguishes different end devices associated with an end point.

In the example in FIG. 1A, if the endpoint is switch 103, endpoint identifier 154 is associated with switch 103 and can be mapped to the switch identifier of switch 103. Token 156 distinguishes the routable MAC addresses for end devices 112 and 114. When switch 103 generates a routable MAC address, switch 103 generates a token for end device 112 and another token for end device 114. For example, if switch 103 generates a routable MAC address for end device 112, OUI 152 is associated with the vendor of switch 103, endpoint identifier 154 is associated with switch 103, and token 156 is associated with end device 112. In some embodiments, token 156 can be a monotonically incremented integer value. Switch 103 first assigns a token to the end device from which switch 103 first receives a packet. Switch 103 then increments the current value for the token and assigns the next token to the next end device.

Length of endpoint identifier 154 can be variable (denoted with a dotted arrow). For example, only 3 bits are needed to represent the switches in network 100. Hence, endpoint identifier 154 for the switches in network 100 can be 3 bits long. The remaining 21 bits can be allocated for token 156. With a 3-bit endpoint identifier, network 100 can support at most eight switches and a respective switch can support up to 2,097,152 end devices (i.e., can generate a routable MAC address for up to 2,097,152 end devices). On the other hand, for a large network with a thousand switches, endpoint identifier 154 should be 10 bits long. The remaining 14 bits can be allocated for token 156, thereby allowing a respective switch to support up to 16,384 routable MAC addresses.

Routable MAC address 150 can be generated statically or dynamically. A user may statically configure routable MAC address 150 for one or more end devices. A switch can dynamically generate routable MAC address 150 as well. In the example in FIG. 1A, a user can statically configure a routable MAC address for end device 118 and create a mapping between the static routable MAC address and end device 118's MAC address. As a result, when switch 102 identifies end device 118's MAC address as the source address in a packet, switch 102 recognizes the routable MAC address from the local mapping and swaps end device 118's MAC address. On the other hand, the routable MAC address for end device 116 can be dynamically configured. When switch 105 learns end device 118's MAC address, switch 105 generates the corresponding routable MAC address.

Figure 1C:
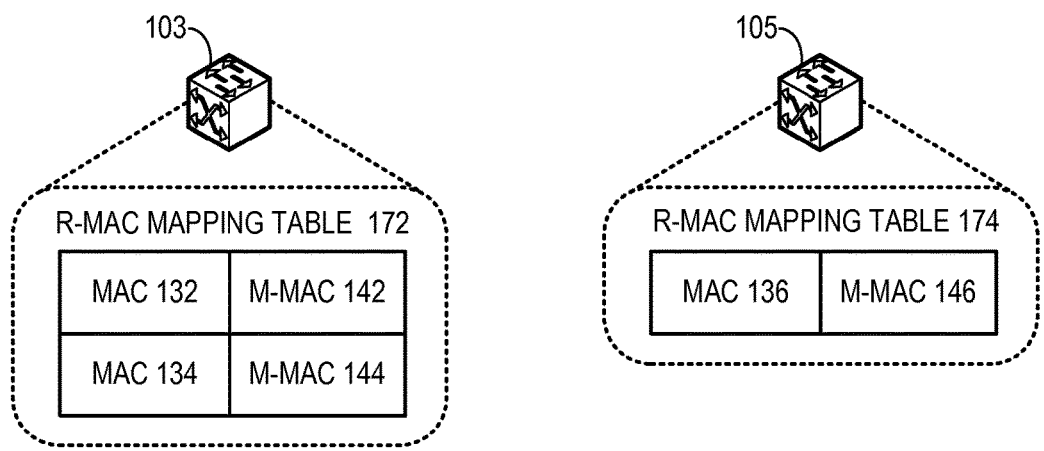
FIG. 1C illustrates an exemplary routable MAC mapping table for scalable MAC address virtualization support, in accordance with an embodiment of the present invention.

FIG. 1C illustrates an exemplary routable MAC mapping table for scalable MAC address virtualization support, in accordance with an embodiment of the present invention. Suppose that end devices 112 and 114 have MAC addresses 132 and 134, respectively. Switch 103 allocates routable MAC addresses 142 and 144, respectively, to end devices 112 and 114. Switch 103 stores a routable MAC address mapping table 172 in a local storage device. Table 172 includes an entry which maps MAC address 132 to routable MAC address 142, and another entry which maps MAC address 134 to routable MAC address 144. When switch 103 identifies MAC address 132 or 134 as a source (or destination) address in the Ethernet header of a packet, switch 103 swaps MAC address 132 or 134 with routable MAC address 142 or 144, respectively. As a result, any device beyond switch 103 is only aware of routable MAC addresses 142 and 144.

Similarly, if end device 116 has MAC address 136, switch 105 allocates routable MAC address 146 to end device 116. Switch 105 stores a routable MAC address mapping table 174 in a local storage device. Table 174 includes an entry which maps MAC address 132 to routable MAC address 142. When switch 105 identifies MAC address 136 as a source (or destination) address in the Ethernet header of a packet, switch 105 swaps MAC address 136 with routable MAC address 146. As a result, any device beyond switch 105 is only aware of routable MAC address 146. In this way, switches in network 100 ensure that other switches and devices are only aware of routable MAC addresses. The other switches and devices, in turn, can use the encoded endpoint identifier in a routable MAC address to forward a packet in network 100.

Figure 1D:
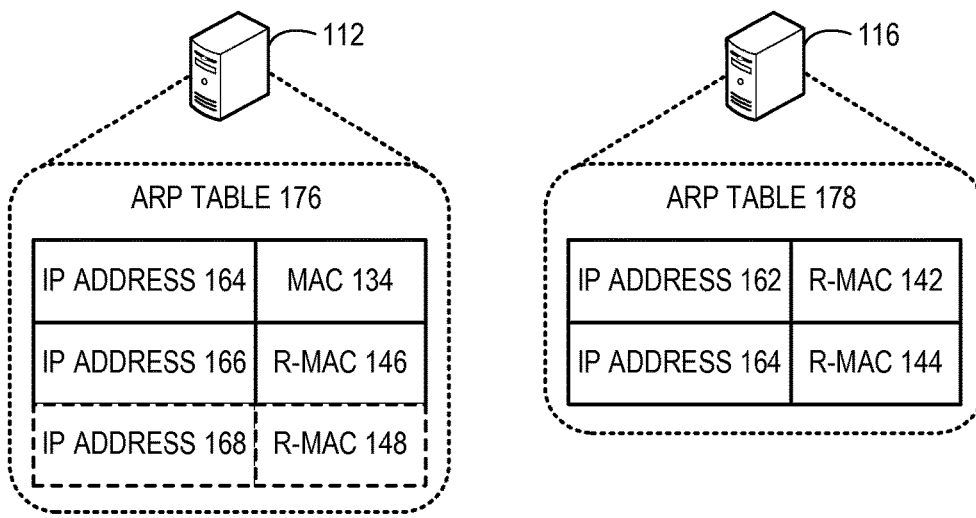
FIG. 1D illustrates an exemplary Address Resolution Protocol (ARP) table with routable MAC addresses, in accordance with an embodiment of the present invention.

FIG. 1D illustrates an exemplary Address Resolution Protocol (ARP) table with routable MAC addresses, in accordance with an embodiment of the present invention. Suppose that end devices 112, 114, 116, and 118 have IP addresses 162, 164, 166, and 168, respectively. If end device 112 wants to initiate a communication with end device 116, end device 112 can send an ARP request for IP address 166 of end device 116 to switch 103. Upon receiving the ARP request, end device 116 issues an ARP reply with its MAC address 136 and sends the ARP reply to switch 105. Switch 105 swaps MAC address 136 with routable MAC address 146 and forwards the ARP reply to end device 112. Upon receiving the ARP reply, end device 112 creates an entry in its local ARP table 176 for end device 116. The entry includes a mapping between IP address 166 and routable MAC address 146.

In the same way, end device 116 can send an ARP request for IP addresses 162 and 164 to switch 105. When the ARP replies reach switch 105, switch 105 swaps MAC addresses 132 and 134 with routable MAC addresses 142 and 144, respectively, and forwards the ARP replies to end device 116. Upon receiving the ARP reply, end device 116 creates corresponding entries in its local ARP table 178. On the other hand, since end devices 112 and 114 are in the same LAN segment, an ARP request for IP address 164 of end device 114 from end device 112 is not forwarded by switch 103. As a result, the ARP reply reaches end device 112 bypassing switch 103. As a result, ARP table 176 includes an entry comprising the mapping between IP address 164 and MAC address 134 of end device 114.

It should be noted that an ARP table entry can also be created statically. For example, a user can statically create an ARP table entry in table 176 with a mapping between IP address 168 and routable MAC address 148 of end device 118 (denoted with dashed lines). The user can configure the entry at switch 103. When switch 103 identifies a local end device (e.g., based on MAC address learning), switch 103 can provide the mapping to that local end device. As a result, when switch 103 identifies end device 112, switch 103 provides the mapping to end device 112, which, in turn, creates a corresponding entry in table 176. This allows end device 112 to initiate communication with end device 118 without the MAC address discovery process.

Distribution

Figure 2A:
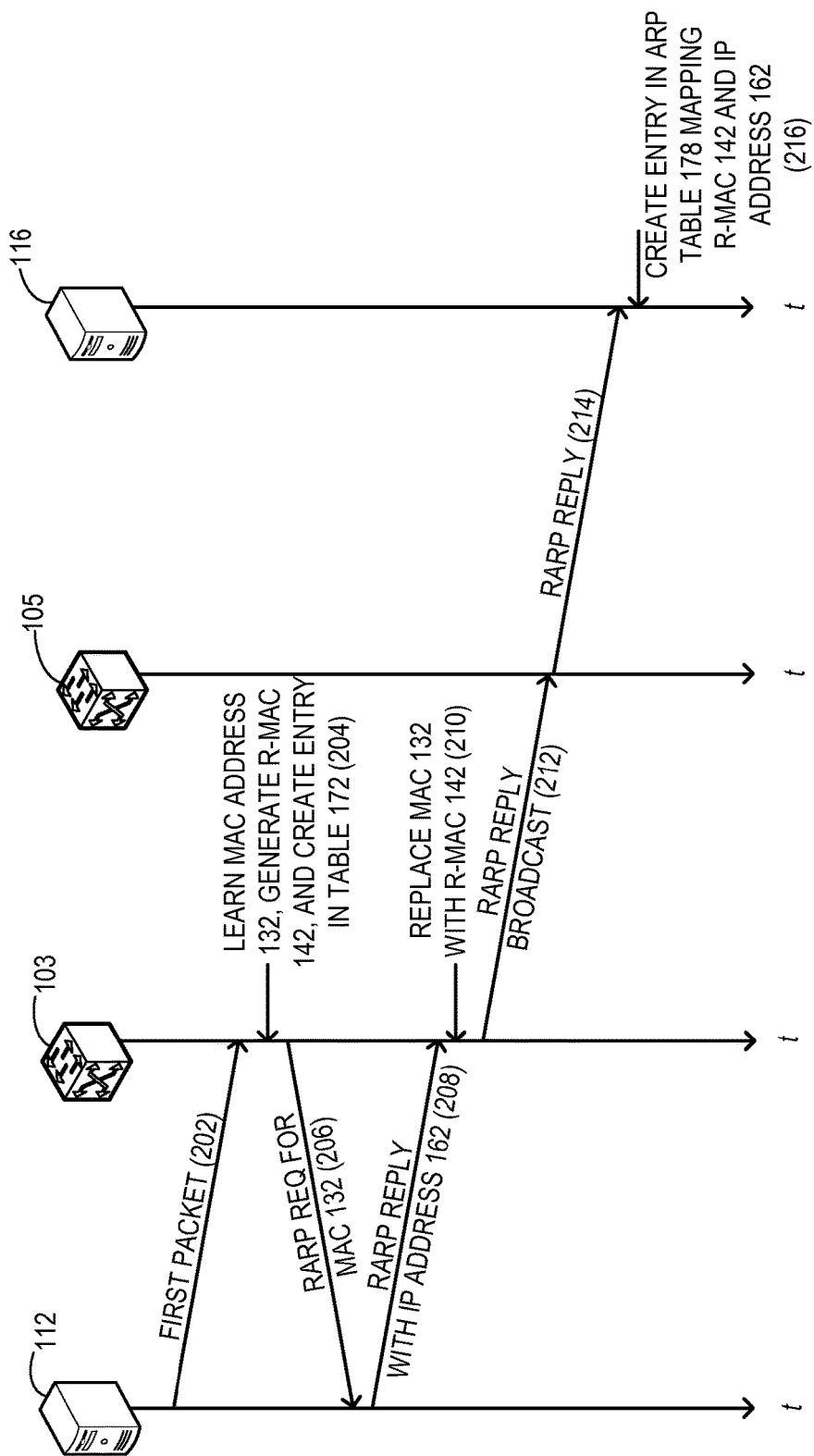
FIG. 2A illustrates an exemplary distribution of routable MAC addresses using Reverse ARP (RARP), in accordance with an embodiment of the present invention.

In the example in FIG. 1A, upon learning end device 112's MAC address 132, switch 103 initiates the routable MAC address generation and distribution process. FIG. 2A illustrates an exemplary distribution of routable MAC addresses using RARP, in accordance with an embodiment of the present invention. During operation, switch 103 receives a first packet from end device 112 via a local edge port (operation 202). Switch 103 then learns MAC address 132, generates routable MAC address 142 for end device 112, and creates a corresponding entry in table 172 (operation 204). The entry includes the mapping between MAC address 132 and routable MAC address 142. Switch 103 sends an RARP query for MAC address 132 via the port from which it has learned MAC address 132 (operation 206).

End device 112 sends an RARP reply with its IP address 162 (operation 208). The RARP reply also includes MAC address 132. Upon receiving the RARP reply, switch 103 replaces MAC address 132 with the corresponding routable MAC address 142 (operation 210) and broadcasts (or multicasts) the RARP reply in network 100 (operation 212). Switch 105 receives the RARP reply and broadcasts the RARP reply via its local edge ports. As a result, end device 116 receives the RARP reply from switch 105 (operation 214). Based on the RARP reply, end device 116 creates an entry in local ARP table 178 mapping routable MAC address 142 and IP address 162 (operation 216).

Figure 2B:
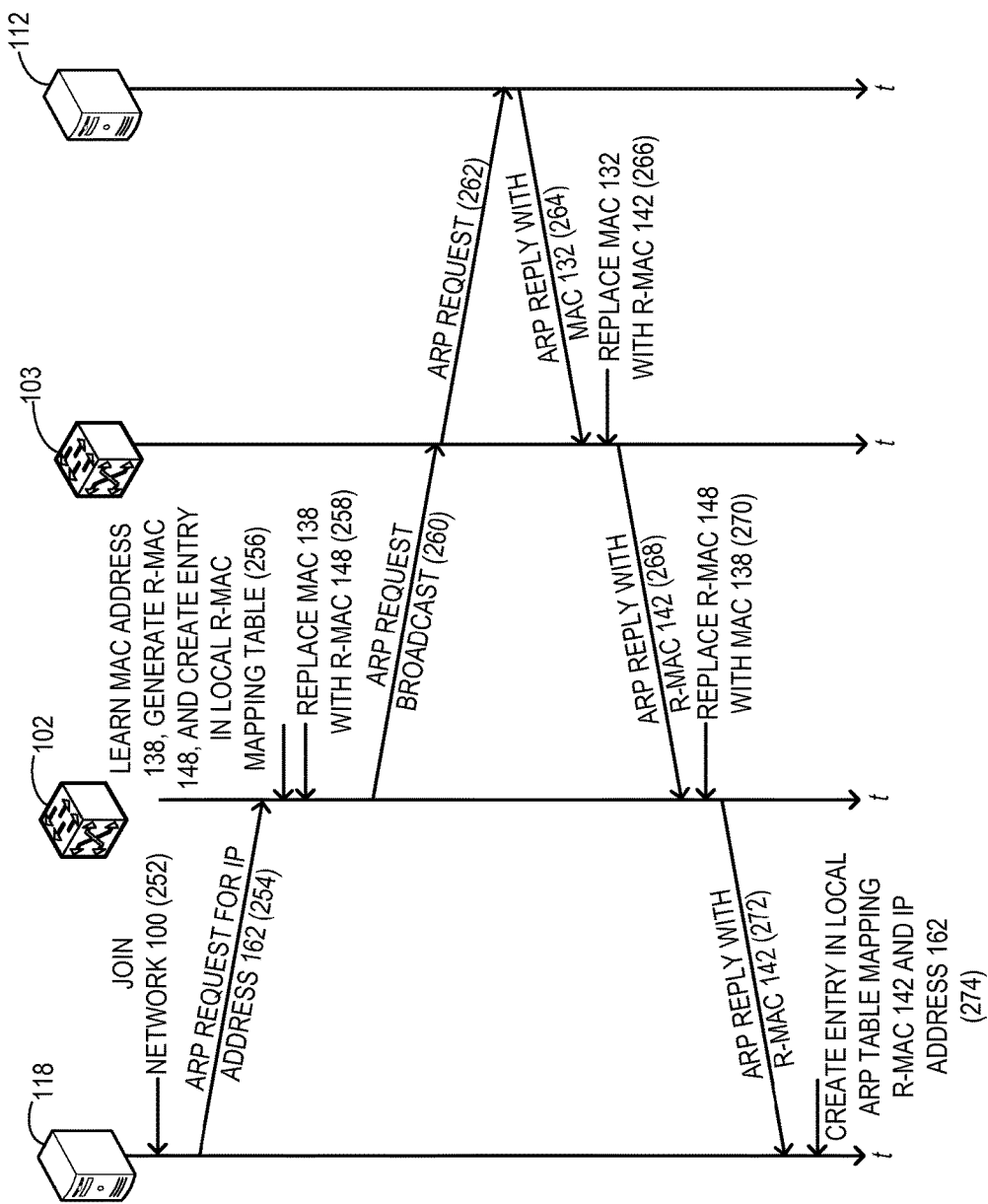
FIG. 2B illustrates an exemplary distribution of routable MAC addresses using ARP, in accordance with an embodiment of the present invention.

In the example in FIG. 1A, suppose that end device 118 is a new end device joining network 100. End device 118 can use ARP to discover the routable MAC address of end device 112. FIG. 2B illustrates an exemplary distribution of routable MAC addresses using ARP, in accordance with an embodiment of the present invention. During operation, end device 118 joins network 100 (operation 252) and sends an ARP request for IP address 162 (operation 254). Switch 102 receives the ARP request and identifies end device 118's MAC address 138. Switch 102 learns MAC address 138, generates a routable MAC address 148 mapped to MAC address 138, and creates a corresponding entry in the local routable MAC address mapping table (operation 256).

Switch 102 then replaces MAC address 138 with routable MAC address 148 in the ARP request (operation 258) and broadcasts (or multicasts) the ARP request in network 100 (operation 260). Switch 103 receives the ARP request and broadcasts the ARP request via its local edge ports. End device 112 receives the ARP request (operation 262) and sends an ARP reply with MAC address 132 of end device 112 (operation 264). The ARP reply also includes IP address 162. Upon receiving the ARP reply, switch 103 replaces MAC address 132 with the corresponding routable MAC address 142 (operation 266) and forwards the ARP reply in network 100 (operation 268). Switch 103 can identify switch 102 to be the egress switch from the endpoint identifier in routable MAC address 148.

Switch 102 receives the ARP reply with routable MAC address 142 of end device 112. Switch 102 replaces routable MAC address 148 with MAC address 138 of end device 118 (operation 270) and forwards the ARP reply via its local edge port from which it has learned MAC address 138 (i.e., the port coupling end device 118) (operation 272). End device 118 receives the ARP reply from switch 102 and creates an entry in the local ARP table mapping routable MAC address 142 and IP address 162 (operation 274).

Operations

Figure 3A:
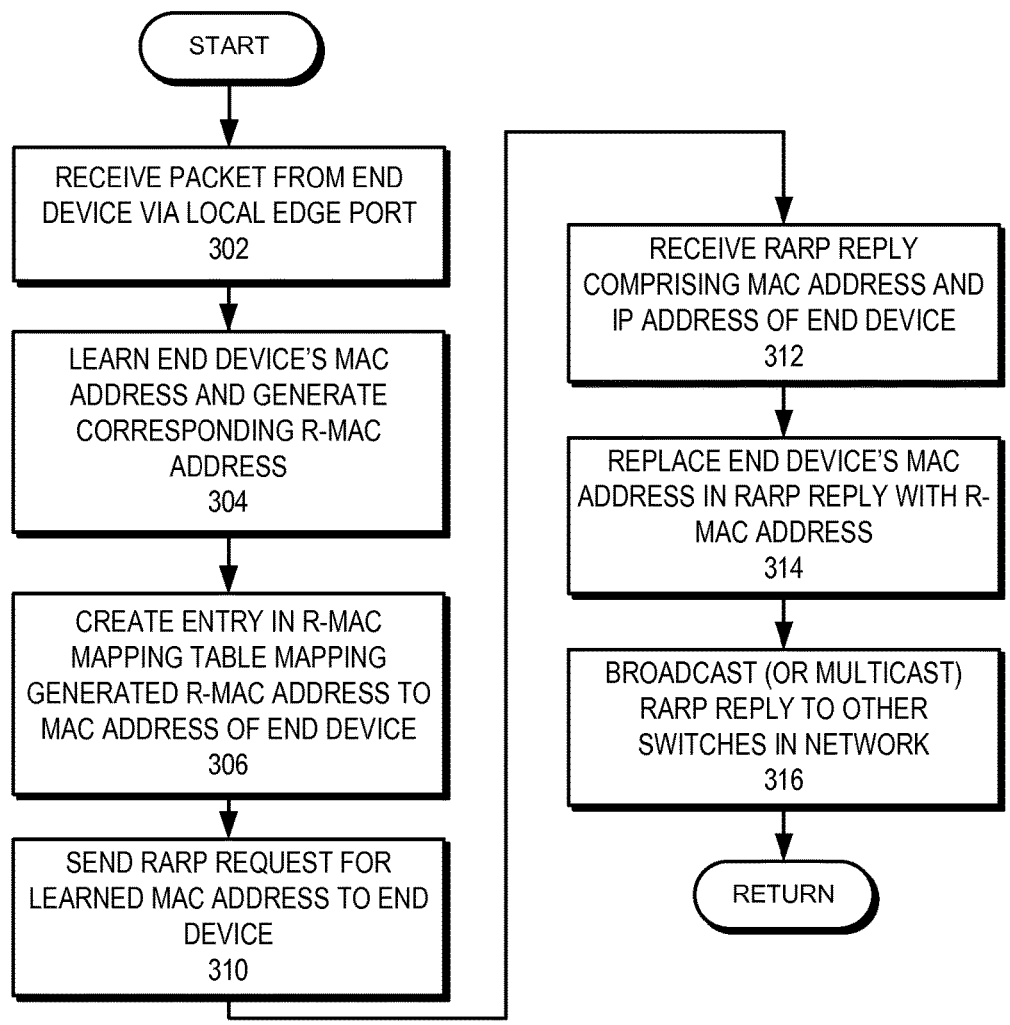
FIG. 3A presents a flowchart illustrating the process of a switch generating and distributing a routable MAC address allocated to a local end device, in accordance with an embodiment of the present invention.

FIG. 3A presents a flowchart illustrating the process of a switch generating and distributing a routable MAC address allocated to a local end device, in accordance with an embodiment of the present invention. During operation, the switch receives a packet from an end device via a local edge port (operation 302). The switch learns the end device's MAC address and generates a corresponding routable MAC address (operation 304). The end device's MAC address is the source address of the packet. The switch creates an entry in the local routable MAC address mapping table mapping the generated routable MAC address to the MAC address of the end device (operation 306).

The switch sends an RARP request for the learned MAC address to the end device (operation 310). Sending a packet includes identifying one or more egress ports for the packet and transmitting the packet via the identified port(s). The switch then receives an RARP reply comprising the MAC address and the IP address of the end device (operation 312). The switch replaces the end device's MAC address in the RARP reply with the corresponding routable MAC address (operation 314) and broadcasts (or multicasts) the RARP reply to the other switches in the network (operation 316). In some embodiments, sending a packet to other switches in the network includes encapsulating the packet in an encapsulation header (e.g., a fabric encapsulation header, such as a TRILL or IP header, or a tunnel encapsulation header, such as a VXLAN or GRE header).

Figure 3B:
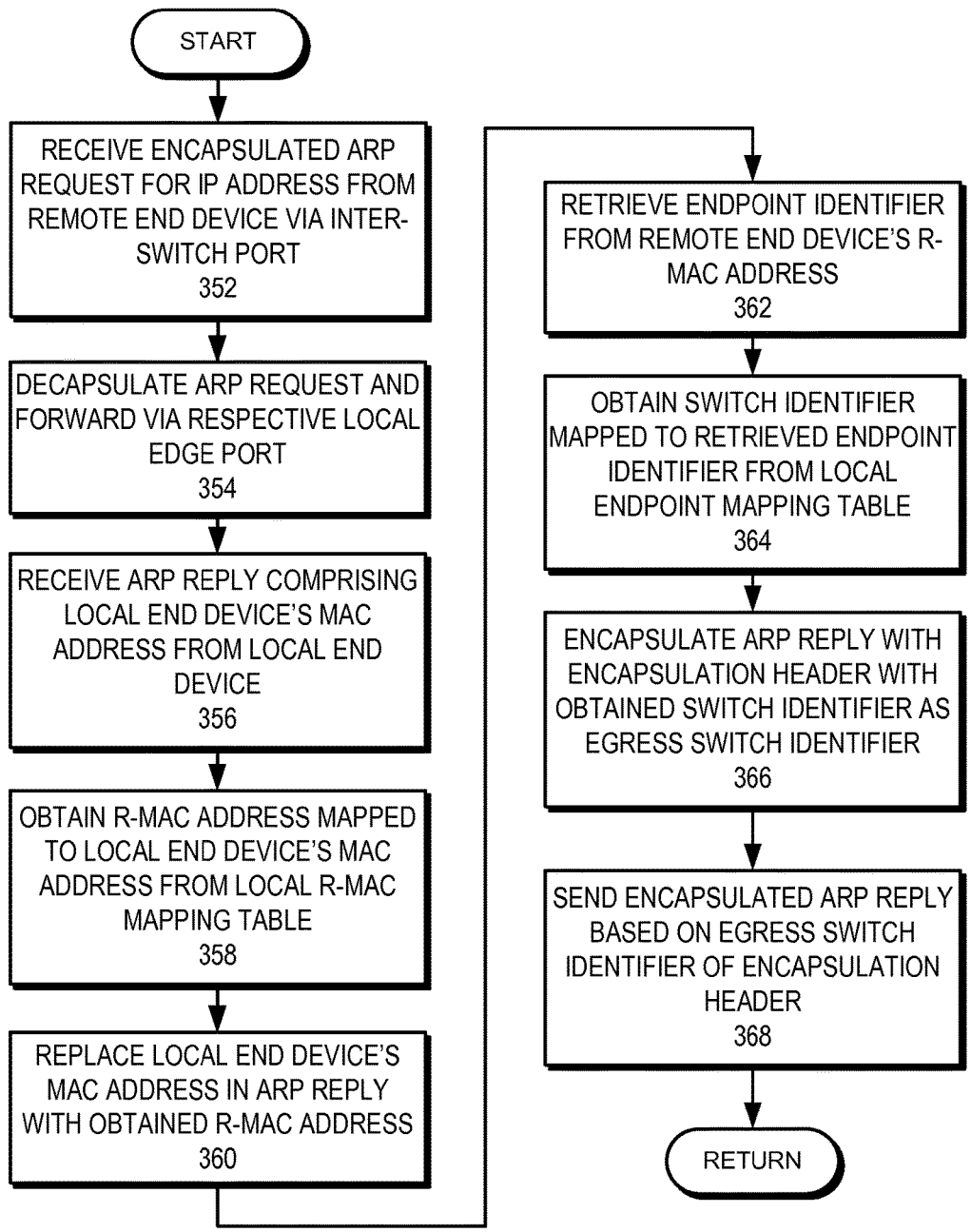
FIG. 3B presents a flowchart illustrating the process of a switch processing an ARP request from a remote end device, in accordance with an embodiment of the present invention.

FIG. 3B presents a flowchart illustrating the process of a switch processing an ARP request from a remote end device, in accordance with an embodiment of the present invention. During operation, the switch receives an encapsulated ARP request for an IP address from a remote end device via an inter-switch port (operation 352). The encapsulation can be based on a fabric encapsulation header or a tunnel encapsulation header. The switch decapsulates the ARP request and forwards the ARP request via the respective local edge port (operation 354). The switch receives an ARP reply comprising a local end device's MAC address from the local end device (operation 356).

The switch obtains the routable MAC address mapped to the local end device's MAC address from the local routable MAC address mapping table (operation 358) and replaces the local end device's MAC address in the ARP reply with the obtained routable MAC address (operation 360). The switch retrieves an endpoint identifier from the remote end device's routable MAC address (operation 362). The remote end device's MAC address is included in the ARP reply. In some embodiments, the switch obtains a switch identifier mapped to the retrieved endpoint identifier from a local endpoint mapping table (operation 364).

The switch can also include a forwarding entry in its local forwarding table for the endpoint identifier. In that case, the switch can directly obtain the forwarding information for the ARP reply from the forwarding table. The switch then encapsulates the ARP reply with an encapsulation header with the obtained switch identifier as the egress switch identifier (operation 366). The switch sends the encapsulated ARP reply based on the egress switch identifier of the encapsulation header (operation 368). In this way, a new switch can learn a routable MAC address based on ARP.

Figure 4:
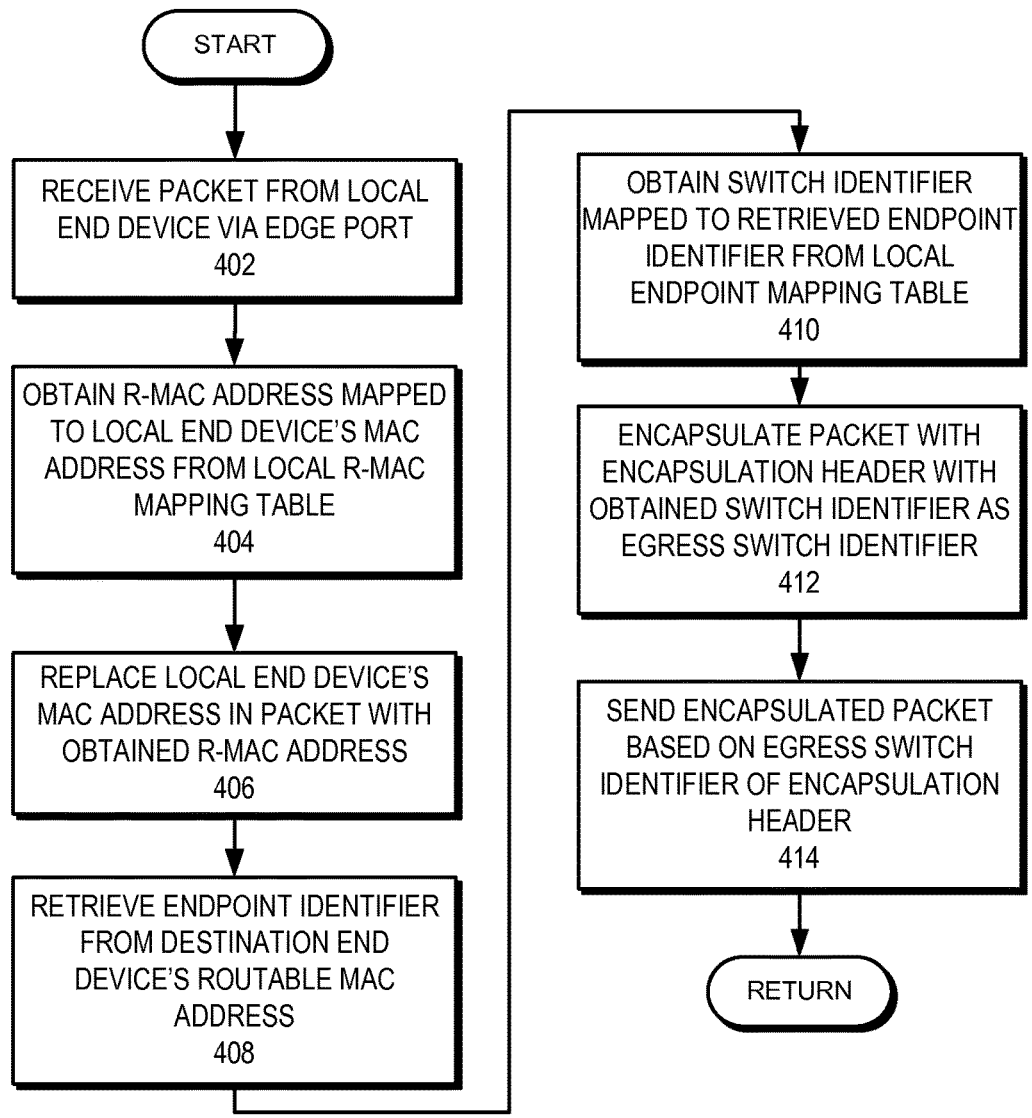
FIG. 4 presents a flowchart illustrating the process of a switch forwarding a packet based on a routable MAC address, in accordance with an embodiment of the present invention.

FIG. 4 presents a flowchart illustrating the process of a switch forwarding a packet based on a routable MAC address, in accordance with an embodiment of the present invention. During operation, the switch receives a packet from a local end device via an edge port (operation 402). The switch obtains the routable MAC address mapped to the local end device's MAC address from the local routable MAC address mapping table (operation 404). The switch then replaces the local end device's MAC address in the packet with the obtained routable MAC address (operation 406). The switch then retrieves an endpoint identifier from the destination end device's routable MAC address (operation 408). Since the local end device is only aware of the routable MAC address of the remote destination end device, the destination MAC address of the packet would be the routable MAC address.

In some embodiments, the switch obtains a switch identifier mapped to the retrieved endpoint identifier from a local endpoint mapping table (operation 410). The switch can also include a forwarding entry in its local forwarding table for the endpoint identifier. In that case, the switch can directly obtain the forwarding information for the packet from the forwarding table. The switch then encapsulates the packet with an encapsulation header with the obtained switch identifier as the egress switch identifier (operation 412). The switch sends the encapsulated packet based on the egress switch identifier of the encapsulation header (operation 414).

Virtual Machine Management

Figure 5A:
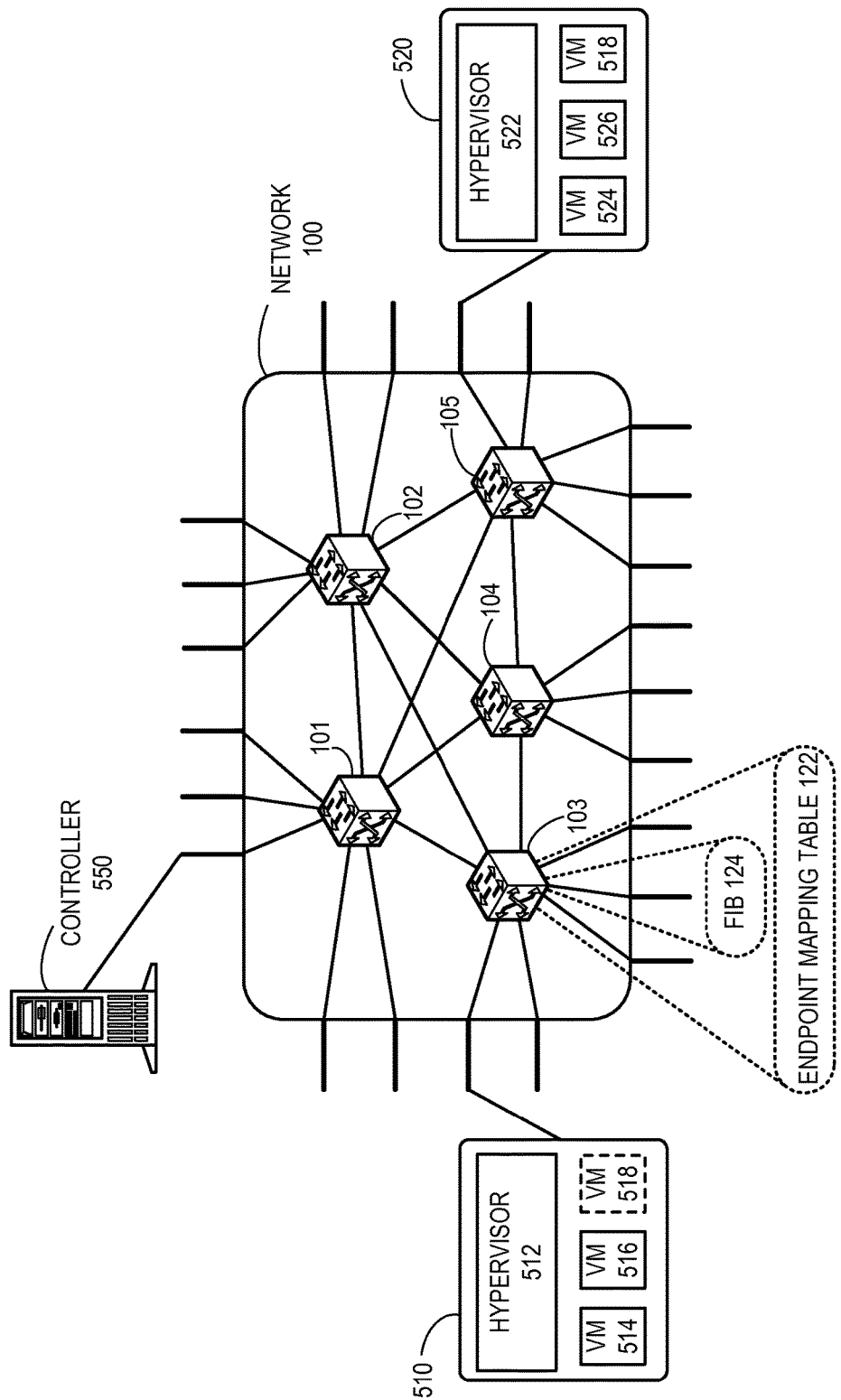
FIG. 5A illustrates exemplary scalable MAC address virtualization support for virtual machines (VMs), in accordance with an embodiment of the present invention.

In some embodiments, a hypervisor of a host machine can notify the switch coupling the host machine of the number of virtual machines the hypervisor is running. The switch can provide a set of routable MAC addresses to the hypervisor based on the number. The hypervisor then directly assigns routable MAC addresses to the virtual machines from that set. FIG. 5A illustrates exemplary scalable MAC address virtualization support for virtual machines (VMs), in accordance with an embodiment of the present invention. In this example, end devices 510 and 520 are host machines hosting a plurality of virtual machines and are coupled to switches 103 and 105, respectively. End device 510 hosts hypervisor 512, which runs virtual machines 514, 516, and 518. Similarly, end device 520 hosts hypervisor 522, which runs virtual machines 524 and 526.

During operation, switch 103 identifies hypervisor 512 running on local end device 510. Hypervisor 512 notifies switch 103 that hypervisor 512 is running three virtual machines. The notification can be based on a control message and the number can be included in the payload of the control message. Switch 103 provides hypervisor 512 with a set of at least three routable MAC addresses from the set of its own routable MAC addresses. These routable MAC addresses encode the endpoint identifier of switch 103 in them. Hypervisor 512 then assigns the routable MAC addresses to virtual machines 514, 516, and 518. Under such a scenario, hypervisor 512 may not use its own virtual address generation technique for assigning virtual MAC addresses to virtual machines 514, 516, and 518.

Switches in network 100 can then directly forward packets using the routable MAC addresses of virtual machines 514, 516, and 518. Upon receiving a packet with a routable MAC address assigned to a virtual machine as the destination address, switch 103 determines that the routable MAC address has been allocated to a virtual machine. Instead of looking up in routable MAC address mapping table 172 for an original MAC address, switch 103 directly forwards the packet via the port coupling end device 510. This allows switch 103 to forward packets from virtual machines without swapping MAC addresses. If switch 103 is only coupled to host machines hosting virtual machines and the virtual machines are directly assigned with routable MAC addresses, switch 103 can operate without maintaining routable MAC address mapping table 172.

If the endpoint identifiers and their corresponding forwarding entries are directly maintained in the forwarding tables in network 100, an endpoint can be a server (e.g., end device 510 or 520). End devices 510 and 520 can maintain their own set of routable MAC addresses. For example, in end device 510, hypervisor 512 assigns the routable MAC addresses to virtual machines 514, 516, and 518 from the set of routable MAC addresses associated with end device 510 (i.e., has end device 510's endpoint identifier). As a result, switches in network 100 can directly forward packets using a routable MAC address of a virtual machine, such as the MAC address of virtual machine 514, to end device 510. To ensure packet forwarding, end devices 510 and 520 can participate in the routing and path formation of network 100. Additionally, a user may configure the forwarding information corresponding to end device 510 and 520 into the forwarding table of the switches in network 100.

During operation, virtual machine 518 migrates from end device 510 to end device 520 (denoted with dashed lines). Virtual machine 518 then starts running under hypervisor 522. As a result, switch 103 no longer receives packets from virtual machine 518 via its local edge port. Switch 103 thus times out virtual machine 518's virtual MAC address from its forwarding table 124 and clears the corresponding entry, if any, in routable MAC address mapping table 172. On the other hand, switch 105 starts receiving packets from virtual machine 518 and learns its virtual MAC address. Switch 105 allocates a routable MAC address for virtual machine 518 and creates a corresponding entry in routable MAC address mapping table 174.

Suppose that virtual machine 518's virtual MAC address is assigned from the routable MAC addresses of switch 103. As a result, switches in network 100 can forward packets to switch 103 based on the endpoint identifier encoded in virtual machine 518's virtual MAC address. However, when virtual machine 518 migrates, the endpoint identifier encoded in virtual machine 518's virtual MAC address does not correspond to the current endpoint (e.g., switch 105). As a result, packets forwarded based on virtual machine 518's virtual MAC address would be still forwarded to switch 103 instead of switch 105. To solve this problem, switch 105 can allocate a routable MAC address, which encodes the endpoint identifier of switch 105, for virtual machine 518. Switch 105 creates an entry in routable MAC address mapping table 174 mapping the newly allocated routable MAC address and virtual machine 518's virtual MAC address.

In some embodiments, upon identifying virtual machine 518 as a new virtual machine, switch 105 can notify switch 103. Switch 105 sends a notification message comprising identifying information of virtual machine 518 (e.g., its original MAC address) to switch 103. Switch 103 receives the notification message and determines that virtual machine 518 has moved to switch 105. Switch 103 then clears virtual machine 518's MAC address from forwarding table 124 and routable MAC address mapping table 172.

In some embodiments, network 100 is a software-defined network and member switches in network 100 can receive flow definitions from a controller 550. Controller 550 can assign a routable MAC address to a virtual machine. Controller 550 can also instruct a switch to directly allocate routable MAC addresses as virtual MAC addresses and specify routable MAC addresses to be allocated. During the migration of virtual machine 518, controller 550 can notify switch 103 regarding the migration and instruct switch 103 to clear the corresponding entry in forwarding table 124 and routable MAC address mapping table 172.

Figure 5B:
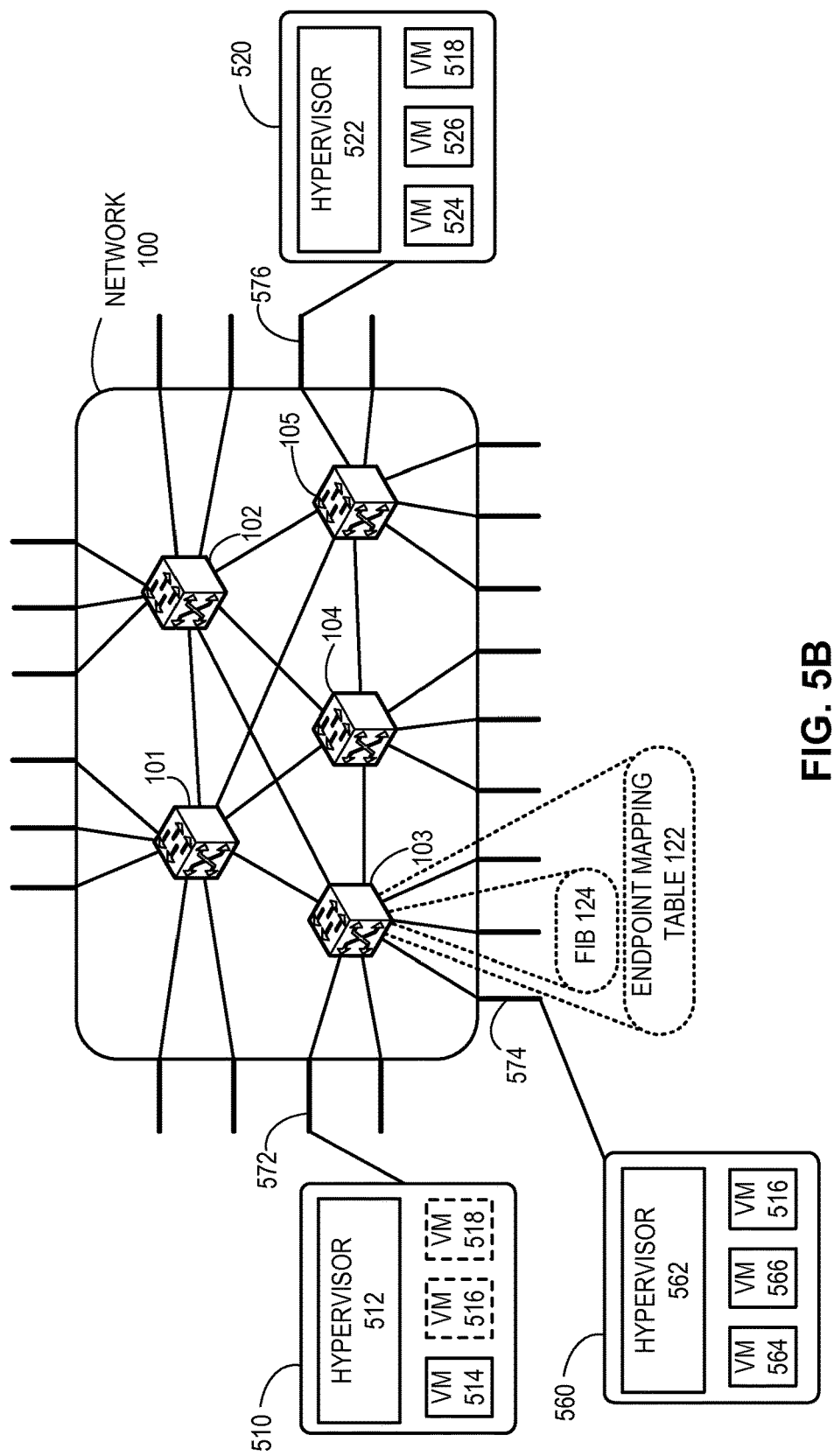
FIG. 5B illustrates exemplary scalable MAC address virtualization support for uniquely identifiable ports, in accordance with an embodiment of the present invention.

FIG. 5B illustrates exemplary scalable MAC address virtualization support for uniquely identifiable ports, in accordance with an embodiment of the present invention. In this example, end device 560 is a host machine hosting a plurality of virtual machines and is coupled to switch 103 via port 574. Similarly, end devices 510 and 520 are coupled to switches 103 and 105 via ports 572 and 576, respectively. End device 560 hosts hypervisor 562, which runs virtual machines 564 and 566. If a respective edge port in network 100 can be uniquely identified by a port identifier, ports 572, 574, and 576 can act as endpoints.

If port 574 acts as an endpoint, routable MAC addresses assigned for virtual machines 564 and 566 encode an endpoint identifier associated with port 574. The endpoint mapping table in a respective switch in network 100 can include a mapping between an endpoint identifier for a port and the unique port identifier. A unique port identifier in network 100 can include one or more of: a switch identifier, a chassis number, and a port number. As a result, a switch in network 100 can identify a corresponding switch from the port identifier and forward a packet with a routable MAC address accordingly. A respective switch in network 100 can also include a forwarding entry for a respective unique port identifier. A switch can forward a packet with a routable MAC address based on the corresponding forwarding entry.

For example, endpoint mapping table 122 of switch 103 includes a mapping between respective endpoint identifiers and unique port identifiers for ports 572 and 574. Similarly, table 122 also includes a mapping between an endpoint identifier and a unique port identifier for port 576. During operation, switch 103 receives a packet with a routable MAC address with the endpoint identifier of port 576 as the destination address. Switch 103 retrieves the unique port identifier mapped to the endpoint identifier from table 122 and identifies the switch identifier of switch 105 from the unique port identifier. Switch 103 then obtains forwarding information associated with switch 105 and forwards the packet accordingly. A respective switch in network 100 can also include a forwarding entry for a respective unique port identifier. Switch 103 can obtain the forwarding information associated with the endpoint identifier from forwarding table 124 and forward the packet to switch 105.

If virtual machine 516 migrates from end device 510 to end device 560 (denoted with dashed lines), virtual machine 516 starts running under hypervisor 562. As a result, switch 103 stops receiving packets from virtual machine 518 via port 572 and starts receiving packets via port 574. Switch 103 then clears virtual machine 516's MAC address from forwarding table 124. Switch 103 then creates another entry in forwarding table 124 mapping virtual machine 516's MAC address with the port identifier of port 574.

Using Routable MAC Addresses

Figure 6:
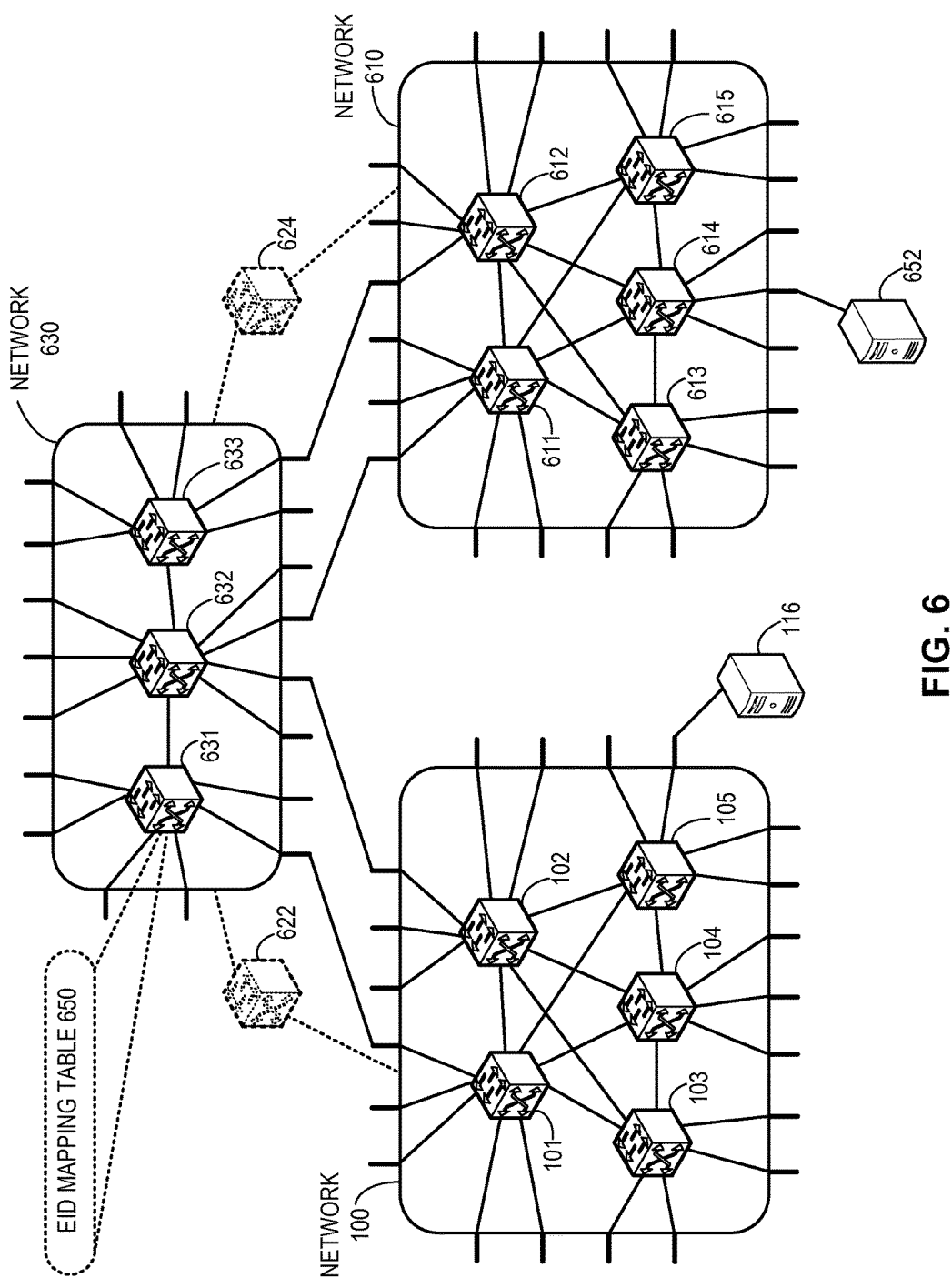
FIG. 6 illustrates an exemplary network with multi-layer scalable MAC address virtualization support, in accordance with an embodiment of the present invention.

Routable MAC addresses can be used in a hierarchy to provide a multi-layer scalable MAC address virtualization. If a plurality of networks is coupled together in a hierarchy, a network can be considered as an endpoint. FIG. 6 illustrates an exemplary network with multi-layer scalable MAC address virtualization support, in accordance with an embodiment of the present invention. In this example, network 100 is coupled to network 630, which is also coupled to network 610. Network 610 includes member switches 611, 612, 613, 614, and 615; and network 630 includes member switches 631, 632, and 633.

Networks 610 and/or 630 can be TRILL networks and a respective member switch can be a TRILL RBridge. Networks 610 and/or 630 can also be IP networks, and a respective member switch can be an IP-capable switch, which calculates and maintains a local IP routing table (e.g., a routing information base or RIB), and is capable of forwarding packets based on its IP addresses. In some embodiments, networks 610 and/or 630 are fabric switches, and one or more member switches can be virtual switches (e.g., a software switch running on a computing device). Member switches in networks 610 and/or 630 use edge ports to communicate with end devices and inter-switch ports to communicate with other member switches.

A respective switch in network 630 can consider networks 100 and 610 as endpoints. Networks 100 and 610 can be associated with respective endpoint identifiers. In some embodiments, networks 100 and 610 can operate as routing elements. For example, networks 100 and 610 can be represented as virtual switches 622 and 624, respectively, with respective virtual switch identifiers. At least one member of network 100 can be associated with virtual switch 622. Similarly, at least one member of network 610 can be associated with virtual switch 624. Virtual switches 622 and 624 appear as member switches of network 610. Forwarding (and routing) tables in network 610 have entries for virtual switches 622 and 624. The endpoint identifiers for networks 100 and 610 can be mapped to the virtual switch identifiers of virtual switches 622 and 624, respectively, in endpoint mapping table 650.

A respective MAC address from network 100 is mapped to a routable MAC address which encodes the endpoint identifier for network 100. Similarly, a respective MAC address from network 610 is mapped to a routable MAC address which encodes the endpoint identifier for network 610. Suppose that a packet destined for end device 652, which is coupled to switch 614, is received at switch 631. The packet has a routable MAC address of network 610 as the destination address. Switch 631 identifies the endpoint identifier encoded in the routable MAC address and obtains the virtual switch identifier of virtual switch 624 from endpoint mapping table 650. Switch 631 forwards the packet in network 630 based on the virtual switch identifier of virtual switch 624. Switch 633 forwards the packet via its edge port coupling switch 612.

Figure 7:
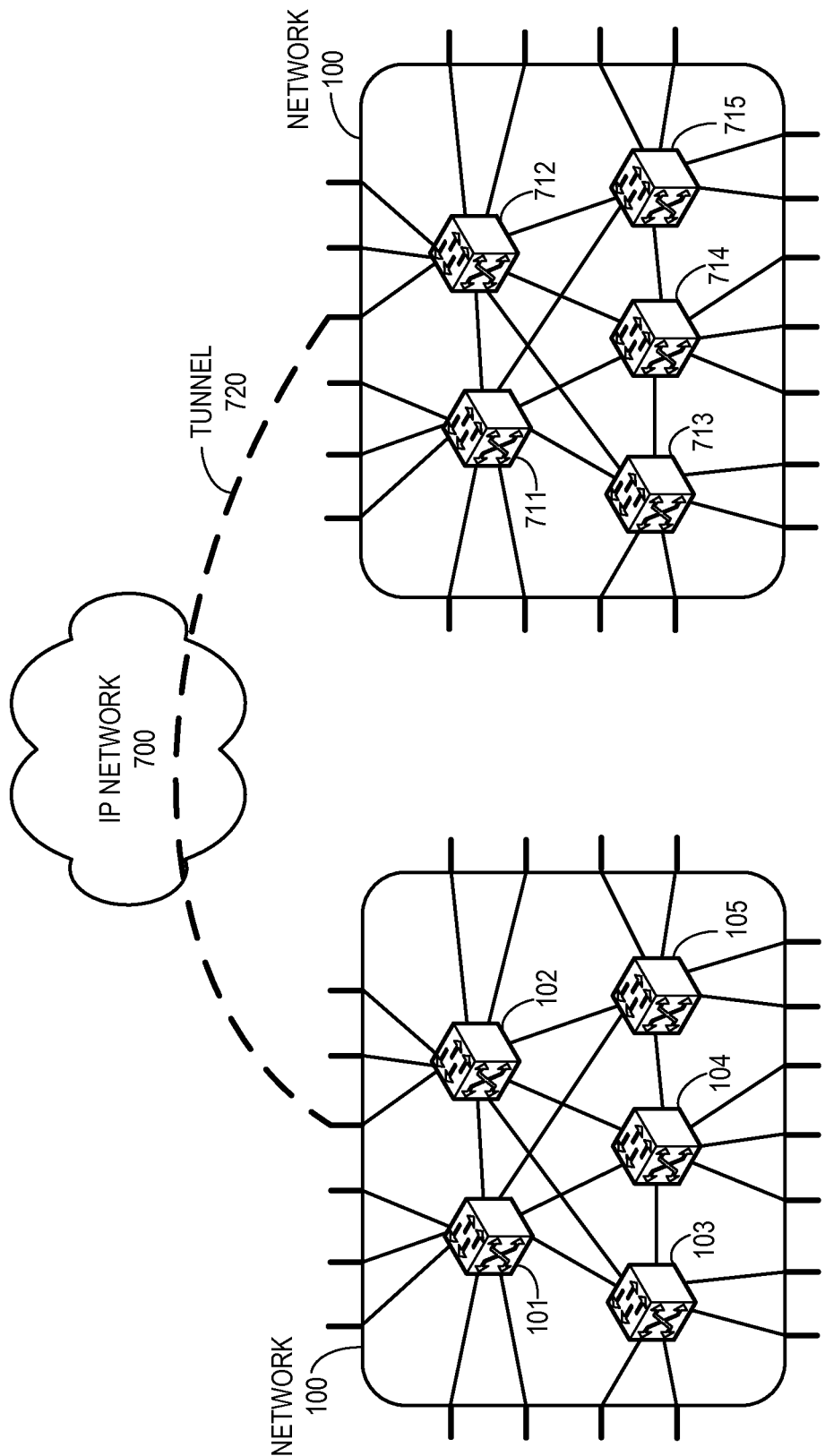
FIG. 7 illustrates an exemplary tunnel with scalable MAC address virtualization support, in accordance with an embodiment of the present invention.

Routable MAC addresses can also be used for forwarding a packet across a tunnel. FIG. 7 illustrates an exemplary tunnel with scalable MAC address virtualization support, in accordance with an embodiment of the present invention. In this example, network 100 is distributed across an Internet Protocol (IP) network 700. Network 100 further includes member switches 711, 712, 713, 714, and 715. The two segments of network 100 can be coupled by a tunnel 720. Examples of a tunnel include, but are not limited to, VXLAN, GRE, and its variations, such as NVGRE and openvSwitch GRE.

Suppose that switches 102 and 712 operate as tunnel gateways (i.e., the tunnel encapsulation and decapsulation points) for tunnel 720. Tunnel 720 can be an endpoint in network 100. Switches 102 and 712 can maintain a mapping between the endpoint identifier and a tunnel identifier (i.e., the system identifier) of tunnel 720. When a switch in network 100 identifies the endpoint identifier associated with tunnel 720 in the routable MAC address of a packet, the switch forwards the packet to the corresponding tunnel gateway. If switch 102 receives the packet, switch 102 identifies the endpoint identifier and forwards the packet to switch 712 via tunnel 720. Forwarding the packet via tunnel 720 includes encapsulating the packet in a tunnel header.

Figure 8:
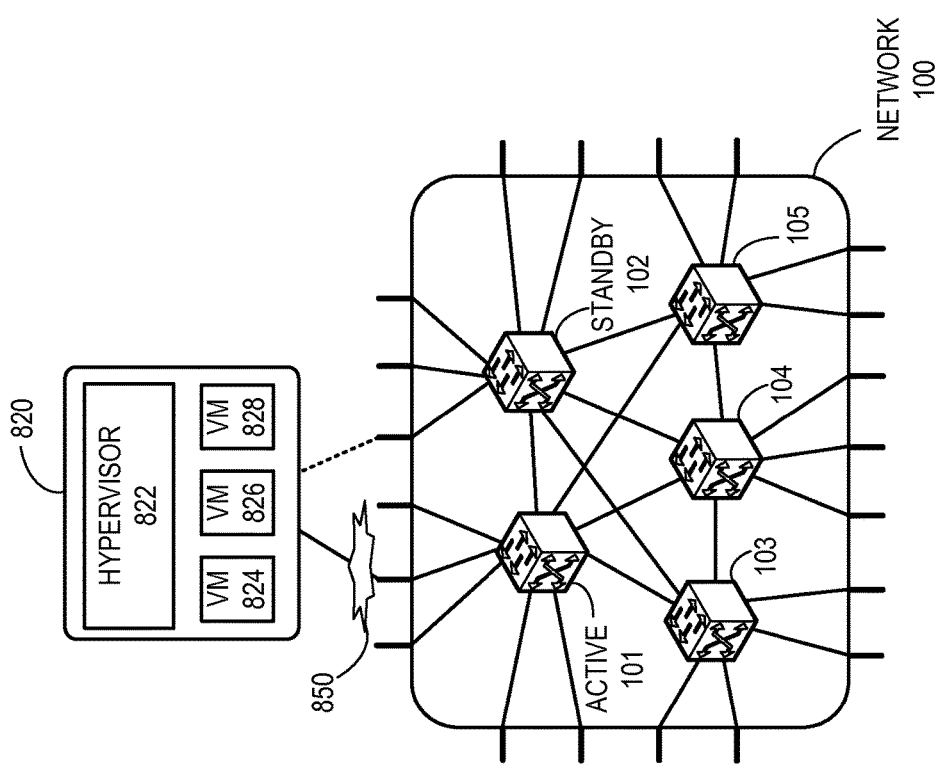
FIG. 8 illustrates exemplary high-availability gateways with scalable MAC address virtualization support, in accordance with an embodiment of the present invention.

Routable MAC addresses can be used for forwarding a packet via high-availability gateways. FIG. 8 illustrates exemplary high-availability gateways with scalable MAC address virtualization support, in accordance with an embodiment of the present invention. In this example, network 100 is coupled to end device 820 hosting hypervisor 822. Hypervisor 822 runs virtual machines 824, 826, and 828. Switches 101 and 102 can operate as high-availability gateways for end device 820. Switch 101 operates as the active gateway and switch 102 operates as the standby gateway.

Switches 101 and 102 together operate as an endpoint in network 100. Switch 101 allocates routable MAC addresses encoding the endpoint identifier of the high-availability gateways for virtual machines 824, 826, and 828. Both switches 101 and 102 can maintain the respective mappings among the virtual identifiers of these virtual machines and the corresponding routable MAC addresses in respective routable MAC address mapping tables. Since switch 101 is the active gateway, a packet from end device 820 is received by switch 101. Switch 101 swaps the original MAC address of the packet with an allocated routable MAC address based on the mapping. Other switches in network 100 forward a packet with the routable MAC address to active switch 101 based on the endpoint identifier of the high-availability gateways.

Suppose that failure 850 makes switch 101 unavailable. Standby switch 102 identifies the unavailability of switch 101 and starts operating as the active switch. From thereon, other switches in network 100 forward a packet with the routable MAC address to switch 102 based on the endpoint identifier of the high-availability gateways. In this way, the same endpoint identifier can be used to forward a packet to the current active gateway of the high-availability gateways. As a result, the routable MAC address can remain persistent during a failure.

Exemplary Switch

Figure 9:
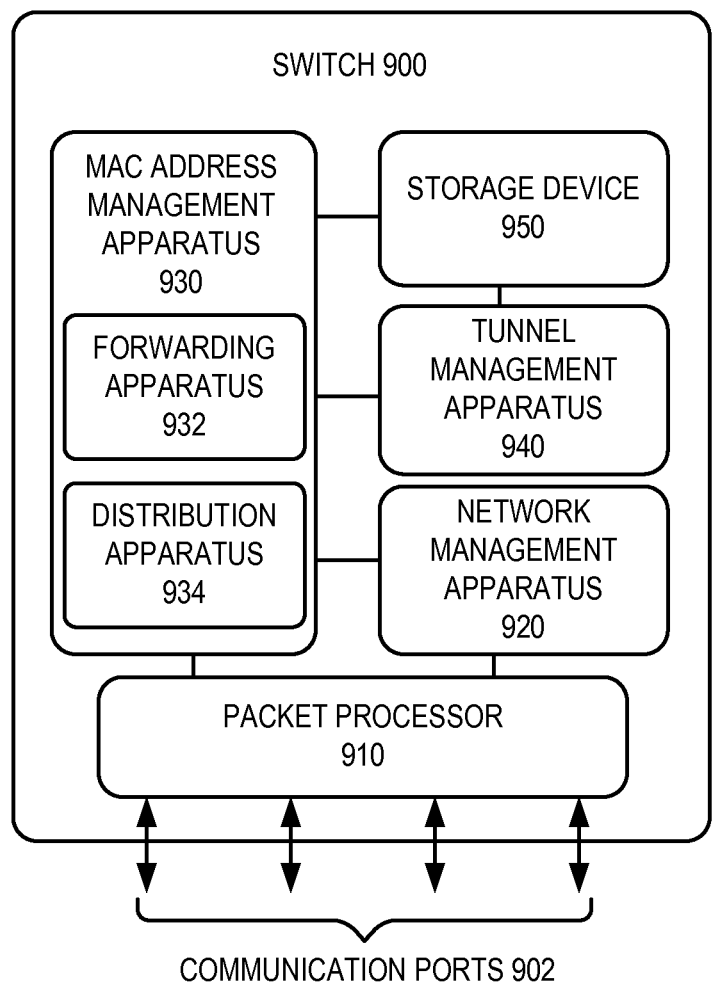
FIG. 9 illustrates an exemplary switch with support for scalable MAC address virtualization, in accordance with an embodiment of the present invention.

FIG. 9 illustrates an exemplary switch with support for scalable MAC address virtualization, in accordance with an embodiment of the present invention. In this example, a switch 900 includes a number of communication ports 902, a packet processor 910, a MAC address management apparatus 930, a forwarding apparatus 932, and a storage device 950. In some embodiments, packet processor 910 adds an encapsulation header to a packet. In some embodiments, switch 900 includes a network management apparatus 920, which maintains a membership in a network of interconnected switches (e.g., in a fabric switch). A respective switch of the network is associated with a group identifier identifying the network.

In some embodiments, the network is a fabric switch. Switch 900 maintains a configuration database in storage device 950 that maintains the configuration state of a respective switch within the fabric switch. Switch 900 maintains the state of the fabric switch, which is used to join other switches. Under such a scenario, communication ports 902 can include inter-switch communication channels for communication within a fabric switch. This inter-switch communication channel can be implemented via a regular communication port and based on any open or proprietary format (e.g., a TRILL or IP protocol).

MAC address management apparatus 930 generates a routable MAC address in response to learning a MAC address of an end device from one of ports 902, and stores a mapping between the learned MAC address and the routable MAC address in a routable MAC address mapping table in storage device 950. Forwarding apparatus 932, in response to identifying the learned MAC address in a header of a packet, swaps the learned MAC address with the routable MAC address. In some embodiments, switch 900 includes a tunnel management apparatus 940, which encapsulates a packet in a tunnel encapsulation header associated with a tunnel. MAC address management apparatus 930 identifies a system identifier of the tunnel mapped to the endpoint identifier from an endpoint mapping table in storage device 950. Forwarding apparatus 932 identifies an egress port associated with the system identifier of the tunnel for the encapsulated packet.

If switch 900 maintains an endpoint mapping table in storage device 950, MAC address management apparatus 930 identifies a system identifier of the endpoint mapped to the endpoint identifier from the endpoint mapping table. Forwarding apparatus 932 then identifies a forwarding entry for the system identifier in a local forwarding table. Otherwise, switch 900 uses the forwarding table for forwarding routable MAC addresses. Forwarding apparatus 932 identifies a forwarding entry for the endpoint identifier in a local forwarding table and selects the port as the egress port for a packet with the routable MAC address as the destination address.

In some embodiments, switch 900 includes a distribution apparatus 934, which generate an RARP request for the learned MAC address. Distribution apparatus 934 modifies an RARP reply by swapping the learned MAC address with the routable MAC address in the RARP reply and determines one or more egress ports for the modified RARP reply. If switch 900 is coupled to an end device hosting a virtual machine, MAC address management apparatus 930 creates a notification message with one or more routable MAC addresses destined for a hypervisor. Upon learning a virtual MAC address of a migrated virtual machine from one of ports 902, MAC address management apparatus 930 constructs a notification message destined for a second switch indicating the migration. Switch 900 and the second switch can operate as high-availability gateways and share a same endpoint identifier.

In summary, embodiments of the present invention provide a switch and a method for scalable MAC address virtualization. In one embodiment, the switch includes one or more ports, a MAC address management apparatus, and a forwarding apparatus. The MAC address management apparatus generates a virtualized routable MAC address in response to learning a MAC address of an end device from one of the one or more ports, and stores a mapping between the learned MAC address and the routable MAC address in a MAC address mapping table in a local storage device. The routable MAC address includes an endpoint identifier identifying an endpoint for the end device. The forwarding apparatus, in response to identifying the learned MAC address in a header of a packet, swaps the learned MAC address with the routable MAC address.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   a storage device;
   address circuitry configured to:
      generate a routable MAC address for an end device in response to learning a first MAC address of the end device from one of the one or more ports, wherein the routable MAC address includes an endpoint identifier identifying one specific endpoint via which the end device is reachable; and
      store a mapping between the first MAC address and the routable MAC address in a MAC address mapping table in the storage device; and
   forwarding circuitry configured to, in response to identifying the first MAC address in a layer-2 header of a packet, replace the first MAC address with the routable MAC address in the layer-2 header of the packet,
   wherein the address circuitry is further configured to identify a switch identifier of the endpoint from an endpoint mapping table in the storage device based on the endpoint identifier,
   wherein the forwarding circuitry is further configured to:
      identify a forwarding entry for the switch identifier in a forwarding table of the switch, wherein the forwarding entry maps the switch identifier to a port of the one or more ports; and
      select the port as the egress port for a packet with the routable MAC address as a destination address of the packet, and
   wherein the endpoint identifier, the routable MAC address, and the switch identifier are all different.

2. The switch of claim 1, wherein the endpoint is one or more of: a switch, an interface, a port, a link aggregation group, a server hosting a virtual machine, a hypervisor, and a tunnel endpoint.

3. The switch of claim 1, wherein the routable MAC address further includes a token representing the end device, wherein the token uniquely identifies the end device from a second end device reachable via the endpoint.

4. The switch of claim 1, wherein the forwarding circuitry is further configured to:
   identify a forwarding entry for the endpoint identifier in a forwarding table of the switch, wherein the forwarding entry maps the endpoint identifier to a port of the one or more ports.

5. The switch of claim 1, further comprising distribution apparatus circuitry configured to:
   generate a Reverse Address Resolution Protocol (RARP) request for the first MAC address;

modify an RARP reply of the RARP request by replacing the first MAC address with the routable MAC address in the RARP reply; and determine one or more egress ports for the modified RARP reply.

6. The switch of claim 1, wherein the address circuitry is further configured to:

learn a virtual MAC address of a migrated virtual machine from one of the one or more ports; and construct a notification message destined for a second switch, wherein the notification message indicates migration of the migrated virtual machine.

7. The switch of claim 1, further comprising tunnel circuitry configured to encapsulate a packet in a tunnel encapsulation header associated with a tunnel;

wherein the address circuitry is further configured to identify a switch identifier of a tunnel endpoint of the tunnel from an endpoint mapping table in the storage device based on the endpoint identifier; and wherein the forwarding circuitry is further configured to identify an egress port associated with the switch identifier for the encapsulated packet.

8. The switch of claim 1, wherein the switch and a second switch are configured to operate as high-availability gateways, and wherein the endpoint identifier is associated with the switch and the second switch.

9. A method, comprising:

generating a routable MAC address for an end device in response to learning a first MAC address of the end device from a port of a switch, wherein the routable MAC address includes an endpoint identifier identifying one specific endpoint via which the end device is reachable;

storing a mapping between the first MAC address and the routable MAC address in a MAC address mapping table in a storage device of the switch;

in response to identifying the first MAC address in a layer-2 header of a packet, replacing the first MAC address with the routable MAC address in the layer-2 header of the packet;

identifying a switch identifier of the endpoint from an endpoint mapping table in the storage device of the switch based on the endpoint identifier;

identifying a forwarding entry for the switch identifier in a forwarding table of the switch, wherein the forwarding entry maps the switch identifier to a port of the switch; and selecting the port as the egress port for a packet with the routable MAC address as a destination address of the packet, wherein the endpoint identifier, the routable MAC address, and the switch identifier are all different.

10. The method of claim 9, wherein the endpoint is one or more of:

a switch, an interface, a port, a link aggregation group, a server hosting a virtual machine, a hypervisor, and a tunnel endpoint.

11. The method of claim 9, wherein the routable MAC address further includes a token representing the end device, wherein the token uniquely identifies the end device from a second end device reachable via the endpoint.

12. The method of claim 9, further comprising:

identifying a forwarding entry for the endpoint identifier in a forwarding table of the switch, wherein the forwarding entry maps the endpoint identifier to a port of the switch.

13. The method of claim 9, further comprising:

generating a Reverse Address Resolution Protocol (RARP) request for the first MAC address;

modifying an RARP reply of the RARP request by replacing the first MAC address with the routable MAC address in the RARP reply; and determining one or more egress ports for the modified RARP reply.

14. The method of claim 9, further comprising:

learning a virtual MAC address of a migrated virtual machine from a port of the switch; and constructing a notification message destined for a second switch, wherein the notification message indicates migration of the migrated virtual machine.

15. The method of claim 9, further comprising:

encapsulating a packet in a tunnel encapsulation header associated with a tunnel;

identifying a switch identifier of a tunnel endpoint of the tunnel from an endpoint mapping table in the storage device of the switch based on the endpoint identifier; and identifying an egress port associated with the switch identifier for the encapsulated packet.

16. The method of claim 9, wherein the switch and a second switch are configured to operate as high-availability gateways, and wherein the endpoint identifier is associated with the switch and the second switch.

* * * * *